(12) United States Patent
Lee et al.

(10) Patent No.: US 10,349,181 B2
(45) Date of Patent: Jul. 9, 2019

(54) ACTUATOR FIXING DEVICE AND PANEL VIBRATION TYPE SOUND-GENERATING DISPLAY DEVICE INCLUDING THE SAME

(71) Applicant: LG DISPLAY CO., LTD., Seoul (KR)

(72) Inventors: Sungtae Lee, Incheon (KR); KwanHo Park, Incheon (KR); YeongRak Choi, Gyeonggi-do (KR); Kwangho Kim, Gyeonggi-do (KR); MyungJin Bae, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/471,164

(22) Filed: Mar. 28, 2017

(65) Prior Publication Data

US 2017/0280215 A1    Sep. 28, 2017

(30) Foreign Application Priority Data

Mar. 28, 2016  (KR) .................. 10-2016-0037118
Apr. 4, 2016   (KR) .................. 10-2016-0040885
(Continued)

(51) Int. Cl.
*H04R 1/02*  (2006.01)
*H04R 1/26*  (2006.01)
(Continued)

(52) U.S. Cl.
CPC ............ *H04R 9/066* (2013.01); *H04N 5/642* (2013.01); *H04R 1/025* (2013.01); *H04R 1/028* (2013.01);
(Continued)

(58) Field of Classification Search
CPC .... H04R 1/028; H04R 1/025; H04R 2499/15; H04R 9/066; H04R 5/02; H04R 5/023;
(Continued)

(56) References Cited

U.S. PATENT DOCUMENTS 4,891,842 A   1/1990  Green
5,025,474 A   6/1991  Tanaka et al.
(Continued)

FOREIGN PATENT DOCUMENTS

CN   1243652 A   2/2000
CN   1547416 A   11/2004
(Continued)

OTHER PUBLICATIONS

U.S. Appl. No. 15/374,566, filed Dec. 9, 2016.
(Continued)

*Primary Examiner* — Davetta W Goins
*Assistant Examiner* — Daniel R Sellers
(74) *Attorney, Agent, or Firm* — Morgan, Lewis & Bockius LLP

(57) ABSTRACT

Provided are an actuator fixing device and a panel vibration type sound-generating display device including the same. A display device includes: a display panel configured to display an image, a cover bottom configured to cover the display panel, and a plurality of sound-generating actuators supported by the cover bottom, the sound-generating actuators being configured to vibrate the display panel to generate sound, at least two of the sound-generating actuators being adjacent to each other.

21 Claims, 18 Drawing Sheets

(30) Foreign Application Priority Data

| | | |
|---|---|---|
| Apr. 5, 2016 | (KR) | 10-2016-0041384 |
| May 30, 2016 | (KR) | 10-2016-0066455 |
| May 31, 2016 | (KR) | 10-2016-0067431 |
| Jun. 30, 2016 | (KR) | 10-2016-0083122 |
| Nov. 30, 2016 | (KR) | 10-2016-0161789 |
| Nov. 30, 2016 | (KR) | 10-2016-0162189 |
| Dec. 30, 2016 | (KR) | 10-2016-0183867 |

(51) Int. Cl.

| | |
|---|---|
| *H04R 1/28* | (2006.01) |
| *H04R 5/02* | (2006.01) |
| *H04R 7/04* | (2006.01) |
| *H04R 9/02* | (2006.01) |
| *H04R 9/06* | (2006.01) |
| *H04R 11/02* | (2006.01) |
| *H04N 5/64* | (2006.01) |
| *H04R 3/14* | (2006.01) |

(52) U.S. Cl.
CPC ............... *H04R 1/26* (2013.01); *H04R 1/288* (2013.01); *H04R 3/14* (2013.01); *H04R 5/02* (2013.01); *H04R 7/045* (2013.01); *H04R 9/025* (2013.01); *H04R 9/06* (2013.01); *H04R 11/02* (2013.01); *H04R 5/023* (2013.01); *H04R 2307/023* (2013.01); *H04R 2307/025* (2013.01); *H04R 2400/03* (2013.01); *H04R 2440/05* (2013.01); *H04R 2499/15* (2013.01)

(58) Field of Classification Search
CPC . H04R 1/26; H04R 1/288; H04R 3/14; H04R 7/045; H04R 9/025; H04R 9/06; H04R 11/02; H04R 2307/023; H04R 2307/025; H04R 2400/03; H04R 2440/05; H04N 5/642
USPC .......................................................... 381/152
See application file for complete search history.

(56) References Cited

U.S. PATENT DOCUMENTS

| | | | |
|---|---|---|---|
| 5,796,854 A | 8/1998 | Markow | |
| 6,137,890 A | 10/2000 | Markow | |
| 6,208,237 B1 | 3/2001 | Saiki et al. | |
| 6,238,755 B1 | 5/2001 | Harvey et al. | |
| 6,342,831 B1 | 1/2002 | Azima | |
| 6,443,586 B1 | 9/2002 | Azima et al. | |
| 6,610,237 B2 | 8/2003 | Azima et al. | |
| 6,618,487 B1 | 9/2003 | Azima et al. | |
| 6,677,384 B1 | 1/2004 | Ikemoto et al. | |
| 6,751,329 B2 | 6/2004 | Colloms et al. | |
| 6,795,561 B1 | 9/2004 | Bank | |
| 6,826,285 B2 | 11/2004 | Azima | |
| 6,871,149 B2 | 3/2005 | Sullivan et al. | |
| 6,911,901 B2 | 6/2005 | Bown | |
| 6,922,642 B2 | 7/2005 | Sullivan | |
| 6,937,124 B1 | 8/2005 | Nakamura et al. | |
| 6,956,957 B1* | 10/2005 | Azima | H04R 9/06 |
| | | | 181/169 |
| 6,985,596 B2 | 1/2006 | Bank et al. | |
| 7,020,302 B2 | 3/2006 | Konishi et al. | |
| 7,050,600 B2 | 5/2006 | Saiki et al. | |
| 7,120,264 B2 | 10/2006 | Saiki et al. | |
| 7,157,649 B2 | 1/2007 | Hill | |
| 7,158,651 B2 | 1/2007 | Bachmann et al. | |
| 7,174,025 B2 | 2/2007 | Azima et al. | |
| 7,184,898 B2 | 2/2007 | Sullivan et al. | |
| 7,215,329 B2 | 5/2007 | Yoshikawa et al. | |
| 7,305,248 B2 | 12/2007 | Mori | |
| 7,372,110 B2 | 5/2008 | Hatano | |
| 7,376,523 B2 | 5/2008 | Sullivan et al. | |
| 7,382,890 B2 | 6/2008 | Saiki et al. | |
| 7,536,211 B2 | 5/2009 | Saiki et al. | |
| 7,545,459 B2 | 6/2009 | Fujiwara et al. | |
| 7,564,984 B2 | 7/2009 | Bank et al. | |
| 7,570,771 B2 | 8/2009 | Whitwell et al. | |
| 7,593,159 B2 | 9/2009 | Yokoyama et al. | |
| 7,657,042 B2 | 2/2010 | Miyata | |
| 7,764,803 B2 | 7/2010 | Kang | |
| 7,769,191 B2 | 8/2010 | Lee et al. | |
| 7,800,702 B2 | 9/2010 | Tsuboi et al. | |
| 7,903,091 B2 | 3/2011 | Lee et al. | |
| 8,174,495 B2 | 5/2012 | Takashima et al. | |
| 8,174,511 B2 | 5/2012 | Takenaka et al. | |
| 8,180,074 B2 | 5/2012 | Ko et al. | |
| 8,194,894 B2 | 6/2012 | Burton et al. | |
| 8,274,480 B2 | 9/2012 | Sullivan | |
| 8,736,558 B2 | 5/2014 | East et al. | |
| 8,830,211 B2 | 9/2014 | Hill | |
| 8,879,766 B1 | 11/2014 | Zhang | |
| 8,917,168 B2 | 12/2014 | Kono et al. | |
| 8,934,228 B2 | 1/2015 | Franklin et al. | |
| 9,001,060 B2 | 4/2015 | Harris | |
| 9,030,447 B2 | 5/2015 | Hsu | |
| 9,035,918 B2 | 5/2015 | Harris et al. | |
| 9,041,662 B2 | 5/2015 | Harris | |
| 9,046,949 B2 | 6/2015 | Adachi et al. | |
| 9,107,006 B2 | 8/2015 | Wang et al. | |
| 9,122,011 B2 | 9/2015 | Oh et al. | |
| 9,137,592 B2 | 9/2015 | Yliaho et al. | |
| 9,148,716 B2 | 9/2015 | Liu et al. | |
| 9,173,014 B2 | 10/2015 | Park | |
| 9,191,749 B2 | 11/2015 | Nabata et al. | |
| 9,197,966 B2 | 11/2015 | Umehara et al. | |
| 9,204,223 B2 | 12/2015 | Nabata et al. | |
| 9,285,882 B2 | 3/2016 | Wang et al. | |
| 9,288,564 B2 | 3/2016 | Faerstain et al. | |
| 9,300,770 B2 | 3/2016 | Nabata et al. | |
| 9,317,063 B2 | 4/2016 | Kwon et al. | |
| 9,332,098 B2 | 5/2016 | Horii | |
| 9,350,832 B2 | 5/2016 | Horii | |
| 9,357,280 B2 | 5/2016 | Mellow et al. | |
| 9,363,591 B2 | 6/2016 | Ozasa et al. | |
| 9,363,607 B2 | 6/2016 | Ando | |
| 9,380,366 B2 | 6/2016 | Kang et al. | |
| 9,389,688 B2 | 7/2016 | Tossavainen et al. | |
| 9,398,358 B2 | 7/2016 | Louh | |
| 9,436,320 B2 | 9/2016 | Kang et al. | |
| 9,544,671 B2 | 1/2017 | Shi et al. | |
| 9,609,438 B2 | 3/2017 | Kim et al. | |
| 9,654,863 B2 | 5/2017 | Crosby et al. | |
| 10,129,646 B2 | 11/2018 | Choi et al. | |
| 2001/0040976 A1 | 11/2001 | Buos | |
| 2001/0043714 A1 | 11/2001 | Asada et al. | |
| 2002/0064290 A1* | 5/2002 | Reynaga | H04R 1/028 |
| | | | 381/152 |
| 2003/0128503 A1 | 7/2003 | Takahashi | |
| 2003/0233794 A1 | 12/2003 | Pylkki et al. | |
| 2005/0129258 A1 | 6/2005 | Fincham | |
| 2005/0129265 A1 | 6/2005 | Nakajima et al. | |
| 2006/0018503 A1 | 1/2006 | Endo | |
| 2006/0078153 A1 | 4/2006 | Sato | |
| 2006/0120542 A1 | 6/2006 | Lee et al. | |
| 2006/0126885 A1 | 6/2006 | Combest | |
| 2006/0140439 A1 | 6/2006 | Nakagawa | |
| 2007/0019134 A1 | 1/2007 | Park et al. | |
| 2007/0036388 A1 | 2/2007 | Lee et al. | |
| 2007/0187172 A1 | 8/2007 | Kaneda et al. | |
| 2007/0206822 A1 | 9/2007 | Whitwell et al. | |
| 2007/0290609 A1 | 12/2007 | Ishii et al. | |
| 2009/0034174 A1 | 2/2009 | Ko et al. | |
| 2009/0034759 A1 | 2/2009 | Ko et al. | |
| 2009/0097692 A1 | 4/2009 | Sakamoto | |
| 2009/0141926 A1* | 6/2009 | Clair | H04R 1/403 |
| | | | 381/404 |
| 2009/0247237 A1 | 10/2009 | Mittleman et al. | |
| 2009/0267891 A1 | 10/2009 | Ali | |
| 2010/0320819 A1 | 12/2010 | Cohen et al. | |
| 2011/0211719 A1 | 9/2011 | Okumura | |
| 2012/0034541 A1 | 2/2012 | Muraoka et al. | |

(56) References Cited

U.S. PATENT DOCUMENTS

| | | |
|---|---|---|
| 2012/0242592 A1 | 9/2012 | Rothkopf et al. |
| 2012/0243719 A1 | 9/2012 | Franklin et al. |
| 2012/0274570 A1 | 11/2012 | Kim |
| 2013/0077810 A1* | 3/2013 | Mellow ............... H04N 5/642 381/333 |
| 2013/0089231 A1 | 4/2013 | Wilk et al. |
| 2013/0106868 A1 | 5/2013 | Shenoy |
| 2013/0250169 A1 | 9/2013 | Kim |
| 2014/0029777 A1 | 1/2014 | Jang |
| 2014/0049522 A1 | 2/2014 | Mathew et al. |
| 2014/0145836 A1 | 5/2014 | Tossavainen et al. |
| 2014/0146093 A1 | 5/2014 | Sako et al. |
| 2014/0197380 A1 | 7/2014 | Sung et al. |
| 2014/0326402 A1 | 11/2014 | Lee et al. |
| 2014/0334078 A1 | 11/2014 | Lee et al. |
| 2015/0010187 A1 | 1/2015 | Lee et al. |
| 2015/0016658 A1 | 1/2015 | Lee |
| 2015/0062101 A1 | 3/2015 | Kim et al. |
| 2015/0078604 A1 | 3/2015 | Seo et al. |
| 2015/0119834 A1 | 4/2015 | Locke et al. |
| 2015/0138157 A1 | 5/2015 | Harris et al. |
| 2015/0195630 A1 | 7/2015 | Yliaho et al. |
| 2015/0341714 A1 | 11/2015 | Ahn et al. |
| 2015/0350775 A1 | 12/2015 | Behles et al. |
| 2016/0011442 A1 | 1/2016 | Lee et al. |
| 2016/0050472 A1 | 2/2016 | Lee et al. |
| 2016/0212513 A1 | 7/2016 | Honda et al. |
| 2016/0261966 A1 | 9/2016 | Won |
| 2016/0345102 A1 | 11/2016 | Tagami et al. |
| 2017/0070811 A1 | 3/2017 | Mihelich et al. |
| 2017/0280216 A1 | 9/2017 | Lee et al. |

FOREIGN PATENT DOCUMENTS

| | | |
|---|---|---|
| CN | 1930910 A | 3/2007 |
| CN | 102946577 A | 2/2013 |
| CN | 203416417 U | 1/2014 |
| CN | 203482271 U | 3/2014 |
| CN | 105096778 A | 11/2015 |
| CN | 107561753 A | 1/2018 |
| CN | 206993387 U | 2/2018 |
| EP | 1 507 438 A2 | 2/2005 |
| EP | 1881731 A1 | 1/2008 |
| EP | 2947857 A2 | 11/2015 |
| JP | 55-25284 A | 2/1980 |
| JP | H02-001987 U | 1/1990 |
| JP | H03-132296 A | 6/1991 |
| JP | 2696801 B2 | 1/1998 |
| JP | H11-44891 A | 2/1999 |
| JP | 2001-61194 A | 3/2001 |
| JP | 2002-511681 A | 4/2002 |
| JP | 2002-264646 A | 9/2002 |
| JP | 2003-211087 A | 7/2003 |
| JP | 3578244 B2 | 10/2004 |
| JP | 2004-343362 A | 12/2004 |
| JP | 2005-175553 A | 6/2005 |
| JP | 2005-244804 A | 9/2005 |
| JP | 2006-138149 A | 6/2006 |
| JP | 2006-186590 A | 7/2006 |
| JP | 2006-319626 A | 11/2006 |
| JP | 2006-325079 A | 11/2006 |
| JP | 3896675 B2 | 3/2007 |
| JP | 2007-267302 A | 10/2007 |
| JP | 2007-528648 A | 10/2007 |
| JP | 2007-300578 A | 11/2007 |
| JP | 2009-100223 A | 5/2009 |
| JP | 2009100223 A | 5/2009 |
| JP | 2009-214060 A | 9/2009 |
| JP | 2009-302924 A | 12/2009 |
| JP | 2010-027845 A | 2/2010 |
| JP | 2010-081142 A | 4/2010 |
| JP | 4449605 B2 | 4/2010 |
| JP | 2011-123696 A | 6/2011 |
| JP | 2012-129247 A | 7/2012 |
| JP | 2012-198407 A | 10/2012 |
| JP | 5060443 B2 | 10/2012 |
| JP | 2013-044912 A | 3/2013 |
| JP | 2013-102360 A | 5/2013 |
| JP | 2014-509028 A | 4/2014 |
| JP | 2014-220237 A | 11/2014 |
| JP | 2014-220802 A | 11/2014 |
| JP | 2015-219528 A | 12/2015 |
| KR | 10-2008-0002228 A | 1/2008 |
| KR | 2008-0063698 A | 7/2008 |
| KR | 10-1026987 B1 | 4/2011 |
| KR | 10-1061519 B1 | 9/2011 |
| KR | 10-1404119 B1 | 6/2014 |
| KR | 101410393 B2 | 6/2014 |
| KR | 2015-0005089 A | 1/2015 |
| KR | 10-2015-0031641 A | 3/2015 |
| KR | 10-1499514 B1 | 3/2015 |
| KR | 10-2015-0131428 A | 11/2015 |
| KR | 2015-133918 A | 12/2015 |
| KR | 10-2017-0135673 A | 12/2017 |
| TW | 200706049 A | 2/2007 |
| TW | M451766 U | 4/2013 |
| TW | 201319783 A | 5/2013 |
| TW | 201503710 A | 1/2015 |
| TW | 201545559 A | 12/2015 |
| WO | 99/52322 A1 | 10/1999 |
| WO | 2005/089014 A1 | 9/2005 |
| WO | 2009/017280 A1 | 2/2009 |
| WO | 2012/129247 A2 | 9/2012 |
| WO | 2015-046288 A1 | 4/2015 |
| WO | 2016/002230 A1 | 1/2016 |

OTHER PUBLICATIONS

U.S. Appl. No. 15/388,939, filed Dec. 22, 2016.
U.S. Appl. No. 15/340,709, filed Nov. 1, 2016.
U.S. Appl. No. 15/471,458, filed Mar. 28, 2017.
U.S. Appl. No. 15/471,431, filed Mar. 28, 2017.
U.S. Appl. No. 15/471,184, filed Mar. 28, 2017.
U.S. Appl. No. 15/471,155, filed Mar. 28, 2017.
U.S. Appl. No. 15/471,164, filed Mar. 28, 2017.
U.S. Appl. No. 15/471,173, filed Mar. 28, 2017.
Communication dated Jun. 30, 2017 from the European Patent Office in related European application No. 16181195.5.
Office Action dated Sep. 26, 2017 from the Japanese Patent Office in related Japanese application No. 2016-190615.
Office Action dated Oct. 3, 2017 from the Japanese Patent Office in related Japanese application No. 2016-235794.
Communication dated Sep. 19, 2017 from the European Patent Office in related European application No. 16181185.6.
Communication dated Sep. 5, 2017 from the European Patent Office in related European application No. 16181191.4.
Taiwanese Office Action dated May 15, 2018, issued in Taiwanese Application No. 106122586.
Japanese Office Action dated Jul. 3, 2018, issued in Japanese Application No. 2016-235794.
Japanese Office Action dated Jun. 5, 2018, issued in Japanese Application No. 2017-131154.
Extended European Search Report issued in European Application No. 17183078.9 dated Jan. 16, 2018.
Extended European Search Report issued in European Application No. 17184428.5 dated Jan. 23, 2018.
Extended European Search Report issued in European Application No. 17184429.3 dated Jan. 26, 2018.
Japanese Office Action issued in Japanese Application No. 2016-216426 dated Nov. 24, 2017.
Taiwanese Office Action issued in Taiwanese Application No. 10720014270 dated Jan. 10, 2018.
Taiwanese Office Action issued in Taiwanese Application No. 10621325350 dated Jan. 3, 2018.
Office Action dated Mar. 27, 2017, from the Korean Patent Office in related Application No. 10-2016-0146951. Note: KR 10-2015-0133918, JP 2009-100223, and JP 2007-300578 cited therein are already of record.

(56) References Cited

OTHER PUBLICATIONS

Office Action dated May 31, 2017, from the Taiwanese Patent Office in related Taiwanese Patent Application No. 106121605.
USPTO Office Action dated Sep. 8, 2017 in related U.S. Appl. No. 15/374,566.
USPTO Office Action dated Oct. 26, 2017 in related U.S. Appl. No. 15/471,458.
USPTO Office Action dated Nov. 9, 2017 in related U.S. Appl. No. 15/471,173.
USPTO Office Action dated Aug. 10, 2017 in related U.S. Appl. No. 15/340,709.
USPTO Office Action dated Oct. 13, 2017 in related U.S. Appl. No. 15/471,184.
Hermida, Alfred, "PC Screen Turns Into Speaker," BBC News, Technology, Mar. 31, 2003, pp. 1-2.
U.S. Office Action dated Dec. 13, 2018, issued in U.S. Appl. No. 15/987,267.
Office Action dated Dec. 11, 2018, issued in Japanese Patent Application No. 2017-131154.
U.S. Office Action dated Dec. 13, 2018, issued in U.S. Appl. No. 15/785,397.
U.S. Pat. No. 9,818,805 B2 cited in the Office Action is the issued patent for related U.S. Appl. No. 15/388,939, which was cited in the IDS Transmittal filed Apr. 28, 2017, and is therefore not included here because the record would be cumulative. U.S. Appl. No. 15/785,397 is a continuation of U.S. Appl. No. 15/388,939.
Non-final Office Action from the U.S. Patent and Trademark Office issued in U.S. Appl. No. 16/038,075 dated Jan. 18, 2019.
Office Action dated Mar. 20, 2019, from the Chinese Patent Office in related Chinese Application No. 201710599021.3.
Office Action dated Apr. 9, 2019, issued by the Japanese Patent Office in related Japanese Application No. 2017-124022.
Final Office Action from the U.S. Patent and Trademark Office issued in U.S. Appl. No. 16/038,075 dated May 14, 2019.
Office Action dated May 14, 2019, from the China National Intellectual Property Administration issued in corresponding Chinese Patent Application No. 201710368161.X.

\* cited by examiner

ACTUATOR FIXING DEVICE AND PANEL VIBRATION TYPE SOUND-GENERATING DISPLAY DEVICE INCLUDING THE SAME

CROSS-REFERENCE TO RELATED APPLICATIONS

This application claims the priority of Korean Application No. 10-2016-0037118, filed Mar. 28, 2016, Korean Application No. 10-2016-0040885, filed Apr. 4, 2016, Korean Application No. 10-2016-0041384, filed Apr. 5, 2016, Korean Application No. 10-2016-0066455, filed May 30, 2016, Korean Application No. 10-2016-0067431, filed May 31, 2016, Korean Application No. 10-2016-0083122, filed Jun. 30, 2016, Korean Application No. 10-2016-0161789, filed Nov. 30, 2016, Korean Application No. 10-2016-0162189, filed Nov. 30, 2016, and Korean Application No. 10-2016-0183867, filed Dec. 30, 2016, all of which are hereby incorporated by reference.

BACKGROUND

1. Technical Field

The present disclosure relates to a display device and, more particularly, to a display device for generating sound by vibrating a display panel and a sound-generating actuator fixing structure used therefore.

2. Discussion of the Related Art

With the development of various portable electronic devices, such as a mobile communication terminal and a notebook computer, a desire for a flat panel display device applicable thereto is increasing. The flat panel display devices include a liquid crystal display (LCD) device, an electroluminescence display device, a light-emitting diode (LED) display device, and an organic light-emitting diode (OLED) display device.

Among these display devices, the liquid crystal display (LCD) device includes an array substrate including an array of thin film transistors, an upper substrate including a color filter and/or a black matrix, etc., and a liquid crystal material layer formed therebetween. An alignment state of the liquid crystal is controlled according to an electric field applied between two electrodes of a pixel area, and thereby, the transmittance of light is adjusted to display images.

Recently, an organic light-emitting diode (OLED) display device coming into the spotlight as a display device has advantages of a fast response time, high light-emitting efficiency, high luminance, and a wide viewing angle by using an OLED that emits light by itself, i.e., is "self-emitting."

Meanwhile, a set device or a finished product including such a display device as described above may include, for example, a television (TV), a computer monitor, or an advertising panel. Such a display device or set device may include a sound output device, such as a speaker, for generating and outputting sound relating to a displayed image.

Typically, a company that manufactures a display portion of a device, such as a liquid crystal display device or an organic light-emitting diode display device, manufactures only a display panel or a display device, while another company that manufactures a speaker assembles the speaker with the manufactured display portion, to complete a set device capable of outputting images and sound. The reverse assembly may also be done, but still in two parts and often in different manufacturing facilities.

FIG. 1 is a plan view of a speaker included in a related art display device.

As shown in FIG. 1, the related art display device 1 or a set device includes a speaker 2 disposed on a rear part or a lower part of a display panel thereof. In this structure, the sound generated by the speaker 2 does not progress directly toward a viewer, who is viewing an image from the front side of the display device 1, but progresses toward the rear part, the lower part, or the edge of the display panel, rather than the front part of the display panel on which the image is being displayed. Therefore, the sound's mismatched directionality may disturb the viewer's immersion experience. In addition, when the sound generated from the speaker 2 progresses toward the rear part, the lower part, or the edge of the display panel of the display panel, the sound quality may be degraded due to an interference with sound reflected by walls, floors, or other surfaces at the rear of or below the display panel.

In addition, the sound generated by a speaker included in the related art display device is not oriented toward a viewer of the display device, and may thus undergo diffraction, which further degrades the sound localization. Moreover, in configuring a set device, such as a TV, a speaker may occupy an undesirably large amount of space, which imposes a restriction on the design and spatial disposition of the set device. In mobile devices, for example, the speaker takes up space that forces a larger size in thickness and/or bezel area.

On the other hand, a technology in which a display panel or a diaphragm attached to a display panel is vibrated by an actuator to output sound, has recently been proposed. Such a sound output scheme may include a diaphragm for generating sound in addition to a display panel, and a scheme of fixing a sound-generating actuator to a support structure of the display device is complicated. Therefore, it is necessary to develop a structure for fixing, to a display device, an actuator for generating sound by vibrating a display panel or a diaphragm.

SUMMARY

Accordingly, the present disclosure is directed to an actuator fixing device and a panel vibration type sound-generating display device including the same that substantially obviate one or more of the issues due to limitations and disadvantages of the related art.

An aspect of the present disclosure is to provide a panel vibration type display device capable of generating sound by vibrating a display panel of the display device.

Another aspect of the present disclosure is to provide a display device including a panel vibration type sound-generating device having improved sound-generating performance and a reduced thickness.

Another aspect of the present disclosure is to provide a sound-generating actuator fixing device capable of maintaining the strength of an actuator support structure even during long-term operation, and a display device including the same.

Another aspect of the present disclosure is to provide a sound-generating actuator fixing device capable of increasing the sound pressure while maintaining the sound characteristics in the entire frequency band, and a display device including the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, a display device may include: a display panel configured to display an image, a cover bottom configured to cover the display panel, and a plurality of sound-generating actuators supported by the cover bottom, the sound-generating actuators being configured to vibrate the display panel to generate sound, at least two of the sound-generating actuators being adjacent to each other.

Furthermore, an apparatus may include: a display panel configured to display an image, a plurality of sound-generating actuators configured to vibrate the display panel to generate sound, a cover bottom configured to cover the display panel, and an actuator fixing device for fixing at least two of the sound-generating actuators to the cover bottom.

Furthermore, an apparatus may include: a display panel configured to display an image, a plurality of sound-generating actuators configured to vibrate the display panel to generate sound, and a reinforcing rib part configured to maintain a distance between at least two of the sound-generating actuators.

Furthermore, an apparatus may include: a display panel configured to display an image, and a plurality of sound-generating actuators configured to vibrate the display panel to generate sound, the plurality of sound-generating actuators including at least a first sound-generating actuator and a second sound-generating actuator, wherein a distance between the first sound-generating actuator and the second sound-generating actuator is smaller than a diameter of the first actuator or a diameter of the second actuator.

Furthermore, an apparatus may include: a display panel configured to display an image, and a plurality of sound-generating actuators configured to vibrate the display panel to generate sound, at least two of the plurality of sound-generating actuators being configured to receive a same control signal for vibrating the display panel.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

FIG. 2A is a plan view. FIG. 2B is a sectional view of FIG. 2A taken along I-I'.

FIG. 4A is a perspective view in one direction. FIG. 4B is a plan view. FIG. 4C is a perspective view in a different direction.

FIG. 9A illustrates an actuator mounting configuration compared to an embodiment of the present disclosure. FIG. 9B is a graph in which the mounting configuration of FIG. 9A is compared to the sound output characteristics in an embodiment of the present disclosure.

Figure 1:
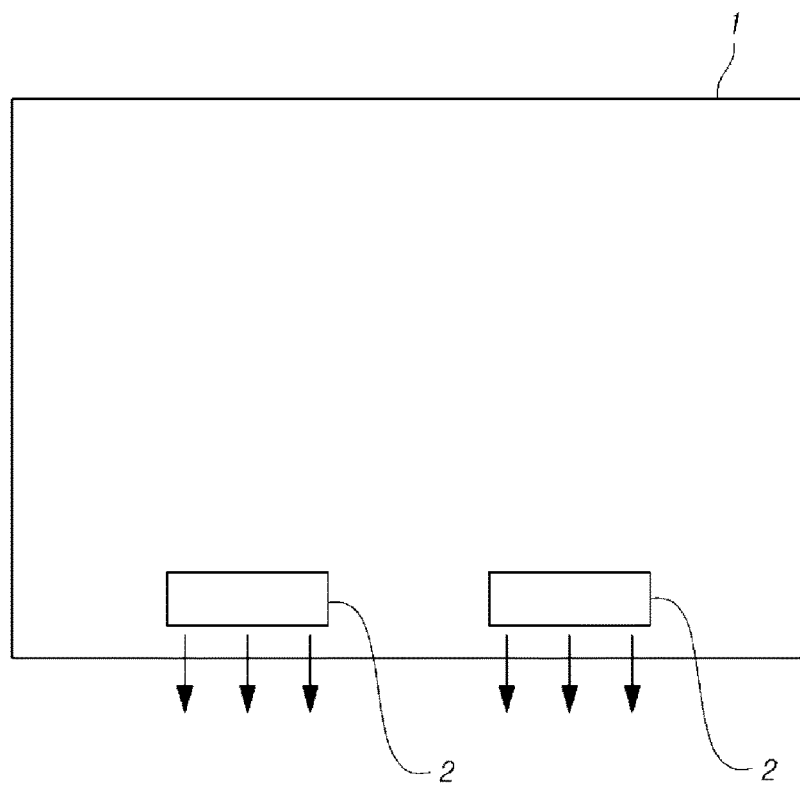
FIG. 1 is a plan view of a speaker included in a related art display device.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to some embodiments of the present disclosure, examples of which are illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout.

Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

The term "display device" used in the specification refers not only to a display device, such as a display panel (or display module), a liquid crystal module (LCM), and an organic light-emitting diode (OLED) module including a driving unit for driving the display panel, but also to a set electronic device or a set device, such as a notebook computer, a television, a computer monitor, equipment display (e.g., display equipment in an automotive display or other type of vehicle display), or to a mobile electronic device, such as a smart phone or an electronic pad, etc., which is a finished product that may include an LCM, an OLED module, and the like. That is, in the present specification, the term "display device" is used as a display device such as the LCM and OLED module and a so-called "set device," which is an application product or final consumer device including a display device implemented therein.

However, in some cases, a "display device" of an LCM and an OLED module including a display panel and a driving unit thereof are distinguished from a "set device" or a "set apparatus." For example, the meaning of a "display device" may include a liquid crystal display panel (LCD) or an organic light-emitting diode (OLED) display panel and a source printed circuit board (PCB) as a controller for driving the same, and the set device or the set apparatus may further include a set PCB, as a set controller, which is electrically connected to the source PCB to control the entire set device or the entire set apparatus.

The display panel used in an embodiment of the present disclosure may include any type of display panel, such as a liquid crystal display (LCD) panel, an organic light-emitting diode (OLED) display panel, etc., and is not limited to a specific display panel technology capable of generating sound waves or audible outputs due to vibrations created by being directly vibrated by the sound-generating actuator.

When the display panel is a liquid crystal display panel, the display panel may include a pixel defined by a plurality of gate lines, a plurality of data lines, and an intersecting area thereof, an array substrate including a thin-film transistor corresponding to a switching element for adjusting a light transmission degree at each pixel, an upper substrate including a color filter and/or a black matrix, etc., and a liquid crystal material layer formed therebetween.

Also, when the display panel is an organic light-emitting diode (OLED) display panel, the display panel may be configured by including a pixel defined in a plurality of gate lines, a plurality of data lines and an intersecting area thereof, and an array substrate including thin film transistors, which are elements for selectively applying a voltage to each pixel, an organic light-emitting diode (OLED) layer on the array substrate, and an encapsulation substrate disposed on the array substrate to cover the organic light-emitting diode layer, and the like. The encapsulation substrate may protect the thin film transistors, the organic light-emitting diode layer, and the like from external impact, and may prevent moisture and/or oxygen from penetrating into the organic light-emitting diode layer. The layer on the array substrate may include an inorganic light-emitting layer, for example, quantum dot emitting layer layer(s), nano-sized material layer(s), etc. that may enhance output image quality. The display panel used in the display device according to the described embodiments of the present disclosure is not limited in its shape, size, type, etc.

With any display type, the display panel may further include a backing, such as a metal plate attached thereto. Other structures may also be included. The display panel having the actuators in the specification may be implemented at a user interface module in a vehicle, such as at the central control panel area in an automobile. For example, such display panel can be configured between two front seat occupants such that sounds due to vibrations of the display panel propagate towards the interior of the vehicle. As such, the audio experience within a vehicle can be improved when compared to having speakers only at the interior sides in the vehicle.

In the case of a liquid crystal display panel, because an indirect light source-type backlight, in which a plurality of layers are stacked and a separate light source is disposed, should be provided. On the other hand, because an organic light-emitting element of an OLED display panel corresponds to a self-light-emitting element, and thus does not require a separate light source, and because several layers, such as a polarizing layer (POL), a glass layer, and an encapsulation layer are laminated into one panel, even if the organic light-emitting element is directly vibrated by the sound-generating actuator, there is almost no influence on the light-emitting characteristics of the organic light-emitting layer, so that image distortion does not occur. However, it is not necessary to use a self-emitting display panel, such as the organic light-emitting diode display panel or the inorganic light-emitting display panel. Meanwhile, because the display panel used in the display device according to an embodiment of the present disclosure has a generic structure, a detailed description of the display panel will be omitted.

Figure 2A:
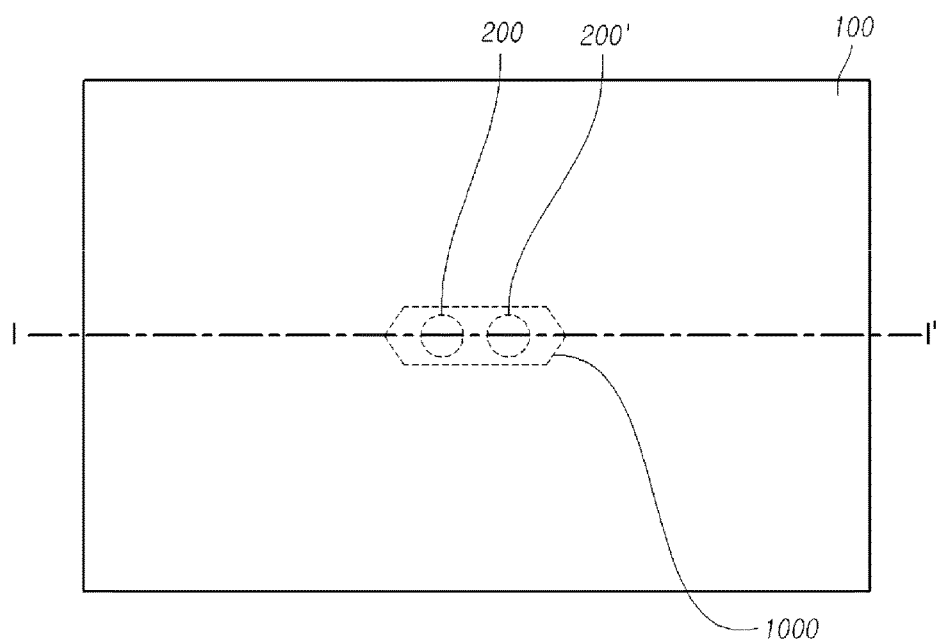
FIGS. 2A and 2B are views of a display device including a panel vibration type sound-generating device to which an embodiment of the present disclosure can be applied.
Figure 2B:
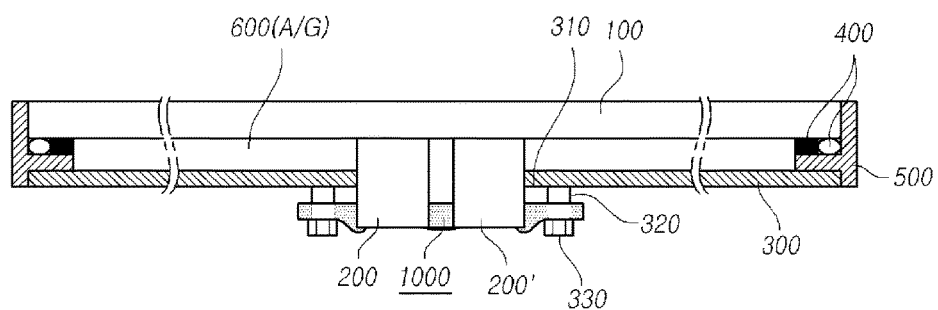

FIGS. 2A and 2B are views of a display device including a panel vibration type sound-generating device to which an embodiment of the present disclosure can be applied. FIG. 2A is a plan view. FIG. 2B is a sectional view of FIG. 2A taken along I-I'.

As shown in FIG. 2, a display device according to an embodiment of the present disclosure may include a display panel 100 for displaying an image, a support structure, e.g., a cover bottom 300, that may be a rear surface support structure of the display device, two sound-generating actuators 200, 200' that are in contact with one surface of the display panel and vibrate the display panel to generate sound, the sound-generating actuators being adjacent to each other, and an actuator fixing device 1000 for fixing the two adjacent sound-generating actuators. Hereinafter, the sound-generating actuators 200, 200' may each be referred to as an "actuator."

As will be described in more detail below, e.g., in FIG. 6, the sound-generating actuator 200 may include a magnet 220, a plate 210 for supporting the magnet 220, a center pole 230 protruding from a central area of the plate 210, and a bobbin 250 surrounding the center pole 230 and having a coil 260 wound thereon, to which a current for generating sound is applied. A distal end 280 of the bobbin 250 may be in contact with one surface of the display panel 100. However, such detailed structure is merely an example, as various other equivalent components can be used to implement the actuators used for the embodiments of the present disclosure.

The actuator fixing device 1000 is a fixing structure for supporting two adjacent actuators and for fixing the actuators to the rear surface support structure of the display device to increase generated sound intensity, that is, sound pressure. The detailed configuration of the actuator fixing device will be described in more detail below with reference to FIG. 3 and the following drawings.

Also, as shown in FIG. 2B, the display device may include a support structure for supporting at least one of the rear surface or the side surface of the display panel 100, and the sound-generating actuator fixing device 1000 may be fixed to the support structure of the display device.

The support structure may include a cover bottom 300 disposed on the rear surface of the display panel 200, and may further include a middle cabinet 500 coupled to the cover bottom 300 while surrounding the side surface of the display panel 100. The middle cabinet 500 may receive and support one side edge of the display panel 100. The support structure may be a cover bottom, e.g., cover bottom 300, and other structures may be included. The support structure, which may be a cover bottom, may include additional parts, may include multiple parts, and need not cover the entire rear of the display panel. The support structure may include other elements (much as an actual product) to directly or indirectly support the actuators.

The cover bottom 300 constituting the support structure may be a plate-shaped member formed of metal or plastic extending over the entire rear surface of the display device. Meanwhile, the cover bottom 300 in the present specification is not limited to the terms "cover" or "bottom," but may be referred to as a plate bottom, a back cover, a base frame, a metal frame, a metal chassis, a chassis base, an m-chassis, and so on. The cover bottom 300 should be understood as a concept including all types of frame or plate-shaped structures disposed at a rear base portion of the display device as a support member for supporting the display panel.

And, the display device according to an embodiment of the present disclosure may further include a baffle part 400 for forming a space or an air gap space 600 (A/G), which is a space for transmitting generated sound waves and being disposed between the display panel 100 and the cover bottom 300 or the middle cabinet 500, e.g., the support structure.

That is, an air gap space 600 (A/G) is formed between the display panel 100 and the cover bottom 300 by tightly coupling the display panel 100 to the cover bottom 300 at the edge of the air gap space 600 (A/G), and the sound waves generated by the actuator vibrating the display panel 100 may be maintained or propagated through the air gap space 600 (A/G).

That is, the baffle part 400 may be at the edge of the cover bottom 300 or middle cabinet 500, and refers to a member defining a space or an air gap space for sealing a gap between the lower surface of the display panel 100 and the support structure (e.g., the cover bottom 300 or middle cabinet 500) of the display device to enable sound generation according to display panel vibration.

In the display panel vibration type display device of an embodiment of the present disclosure, the intensity of the sound generated in accordance with the output or the size of the actuator for vibrating the display panel 100, that is, the sound pressure is determined. On the other hand, to increase the output of the actuator, the size of the actuator should be increased. In such a case, a concern in that the thickness of the entire display device may increase.

Therefore, a plurality of actuators may be used, in which the same control signal is provided to generate sound having a sound intensity (sound pressure) higher than a certain level while maintaining the thinness of the display device. On the other hand, when a plurality of actuators, which operate in the same manner, are disposed apart from each other, the sound output characteristics may be degraded due to interference or resonance of sound waves generated in the actuators. Therefore, when arranging the plurality of actuators for increasing the sound pressure, it may be necessary to arrange the plurality of actuators adjacent to each other to maintain the sound characteristics.

However, even if two or more actuators are disposed adjacent to each other, when two actuators are separated, a so-called "dip" phenomenon, in which a strong sound pressure is generated at a specific frequency, may occur due to interference between the actuators and a delay phenomenon. Therefore, an embodiment of the present disclosure provides an actuator fixing device 1000 capable of integrally supporting at least two or more actuators adjacent to each other and fixing the actuators to the support structure (e.g., cover bottom) of the display device.

From this point of view, the configuration of the display device according to an embodiment of the present disclosure will be described. The panel vibration type sound-generating display device according to an embodiment of the present disclosure may include a display panel 100 for displaying an image, a cover bottom 300, as a rear surface support structure, for covering and supporting at least the rear surface of the display panel, at least two or more sound-generating actuators 200 and 200' inserted into a support hole 310 disposed in the cover bottom 300 and having distal ends in contact with one surface of the display panel 100 to vibrate the display panel 100 and generate sound, and an actuator fixing device 1000 for integrally supporting the at least two or more sound-generating actuators 200 and 200' to be adjacent to each other and fixing the at least two or more sound-generating actuators 200 and 200' to the cover bottom 300.

The configuration according to an embodiment of the present disclosure will be described in more detail with reference to FIGS. 3 to 8. Hereinafter, for convenience, the examples described herein of a sound-generating actuator includes two actuators which are referred to as a "first actuator 200" and a "second actuator 200'," but embodiments of the present disclosure are not limited thereto.

Figure 3:
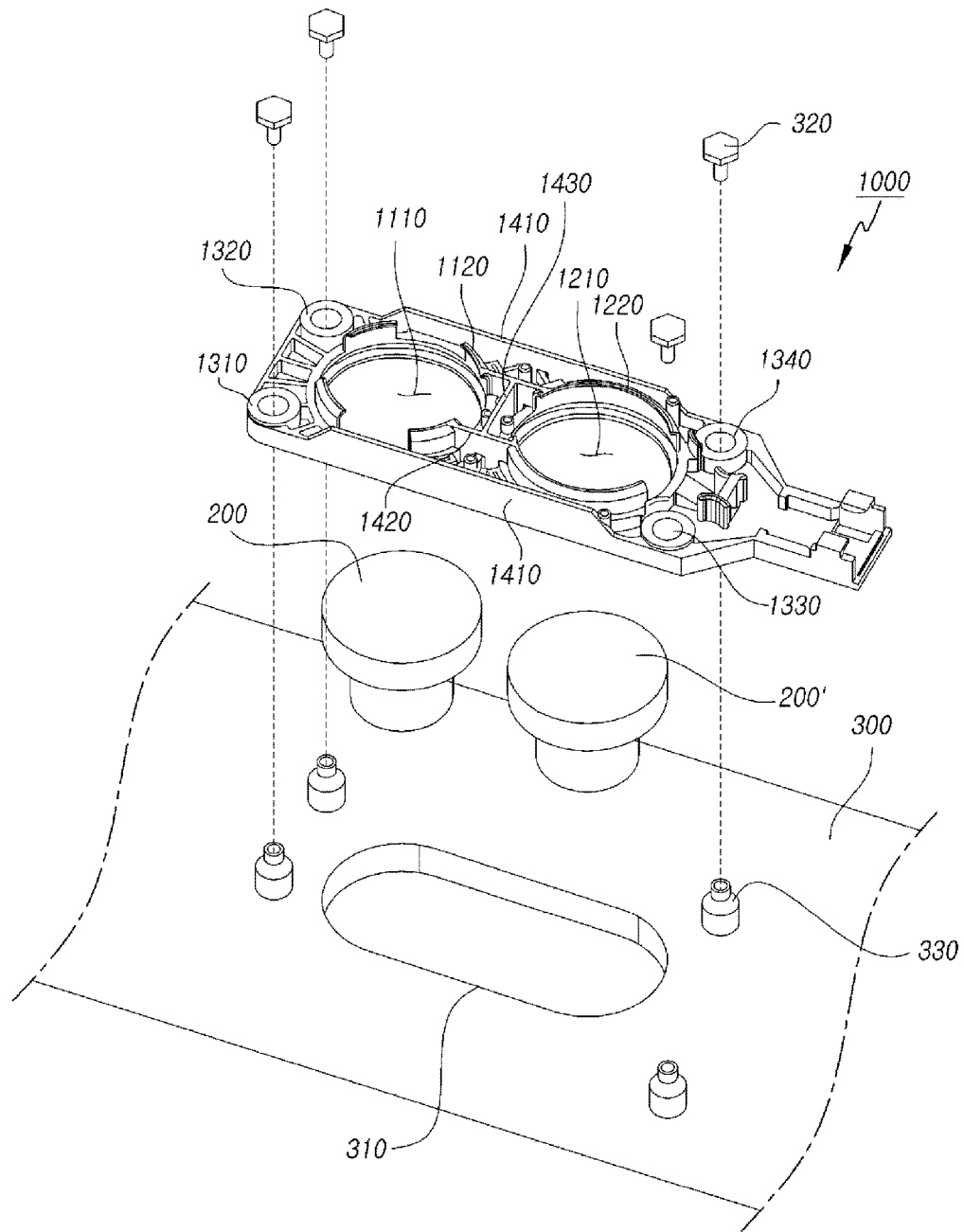
FIG. 3 is a perspective view illustrating an actuator fixing device and a structure fixed to a support structure of a display device according to an embodiment of the present disclosure.
Figure 4A:
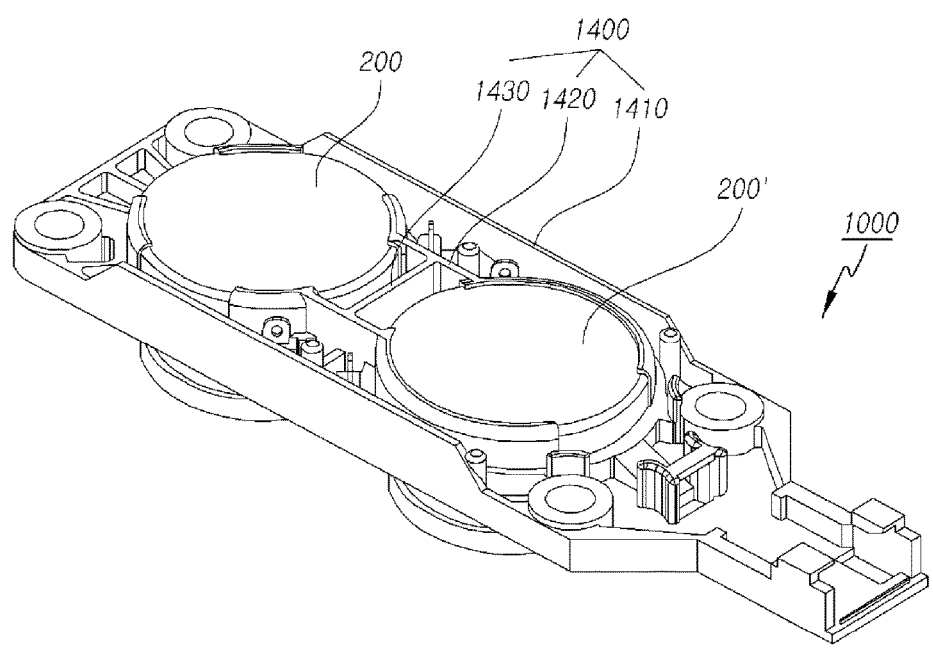
FIGS. 4A, 4B, and 4C are views of a combination of an actuator fixing device and an actuator according to an embodiment of the present disclosure.
Figure 4B:
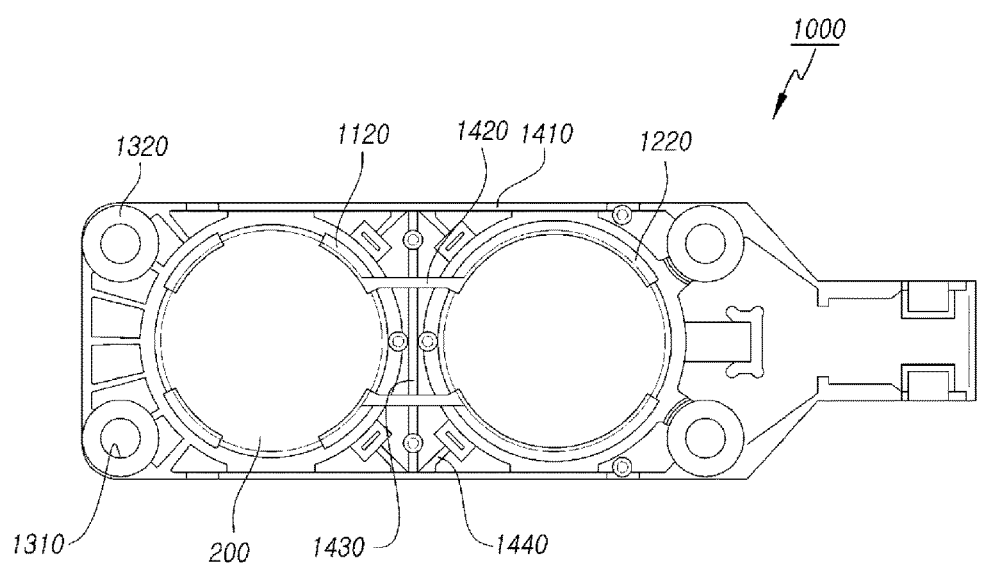
Figure 4C:
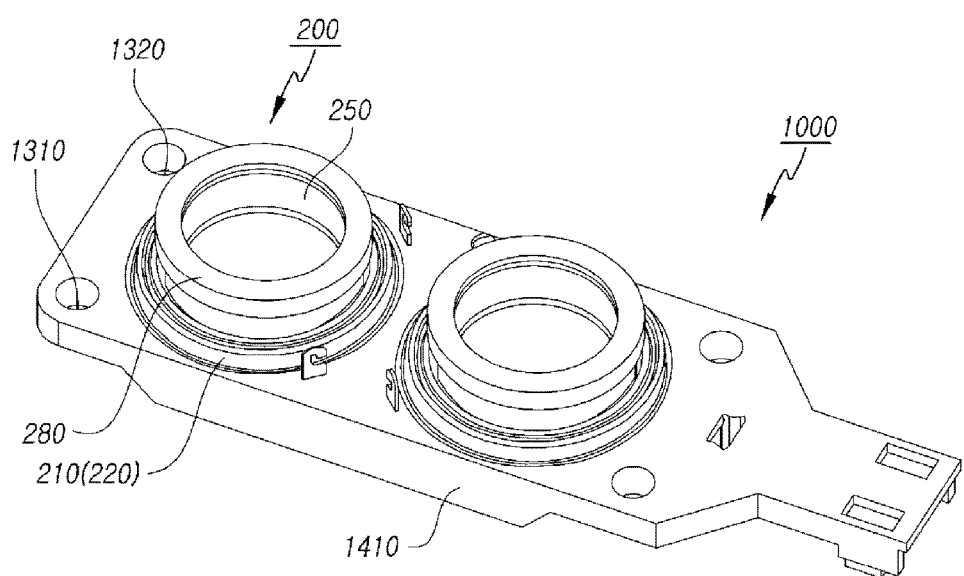

FIG. 3 is a perspective view illustrating an actuator fixing device and a structure fixed to a cover bottom that is a support structure of a display device according to an embodiment of the present disclosure. FIGS. 4A, 4B, and 4C are views of a combination of an actuator fixing device and an actuator according to an embodiment of the present disclosure. FIG. 4A is a perspective view in one direction. FIG. 4B is a plan view. FIG. 4C is a perspective view in a different direction.

As shown in FIG. 3, the actuator fixing device 1000 used in an embodiment of the present disclosure is an integral fixing structure for fixing and supporting the first actuator 200 and the second actuator 200' to be adjacent to each other. Such an actuator fixing device 1000 may be a mold structure that may be formed of a material, such as plastic, by a molding method, but embodiments are not limited thereto.

In more detail, the actuator fixing device 1000 according to an embodiment of the present disclosure may include a first support part 1120 for supporting the first actuator 200, a second support part 1220 for supporting the second actuator 200', a reinforcing rib part 1400 disposed adjacent to the first support part 1120 and the second support part 1220, and a plurality of mounting holes 1310-1340 for fixing the actuator fixing device 1000 to the cover bottom 300.

The first support part 1120 may be a cylindrical structure supporting a part of the side surface and the rear surface of the first actuator 200. A first receiving part 1110, in which a part of a rear portion of the first actuator 200 may be received, may be formed inside the first support part 1120.

Similarly, the second support part 1220 may be a cylindrical structure supporting a part of the side surface and the rear surface of the second actuator 200'. A second receiving part 1210, in which a part of a rear portion of the second actuator 200' is received, may be formed inside the second support part 1220.

The first support part 1120 and the second support part 1220 may be configured, e.g., by two or four arcuate protruding parts. Distal ends of the protruding parts may be bent inward to support a part of a rear surface of each actuator 200 and 200', thereby preventing the actuator from deviating toward the outside of the actuator fixing device 1000.

A plurality of reinforcing rib parts may be formed in the vicinity of the first support part and the second support part to prevent the actuator fixing device from being deformed even during long-term use, while maintaining the rigidity of the actuator fixing device 1000. In more detail, the reinforcing rib part 1400 may include a first longitudinal rib part 1410 extending in the longitudinal direction at the outer periphery of the first support part 1120 and the second support part 1220, a second longitudinal rib part 1420 for longitudinally connecting the first support part 1120 and the second support part 1220, and a transverse rib part 1430 extending perpendicularly to the second longitudinal rib part 1420. In the present disclosure, for convenience of description, a long-side direction in which the two actuators are arranged is referred to as the "longitudinal" direction, and a short-side direction perpendicular to the longitudinal direction is referred to as the "transverse" direction.

The first longitudinal rib part 1410 may extend longitudinally outwardly of the first support part 1120 and the second support part 1220 to form a longitudinal outer structure of the actuator fixing device 1000. The central area of the first longitudinal rib part 1410, that is, the central area between the first support part 1120 and the second support part 1220, may be higher than both side areas of the first longitudinal rib part 1410 in height, or the first longitudinal rib part 1410 may be thicker than the first support part 1120 and the second support part 1220. Therefore, even if the two actuators vibrate with high output power for a long time, the deformation of the actuator fixing device is prevented, and a change in the relative position between the two actuators 200 and 200' and the display panel 100 is reduced.

On the other hand, at least one second longitudinal rib part 1420 that is integrally connected to the first support part 1120 and the second support part 1220 may be disposed inside the first longitudinal rib part 1410. In FIG. 3 and FIG. 4, two second longitudinal rib parts 1420 are shown, but the present disclosure is not limited thereto. For example, one, three, or more second longitudinal rib parts 1420 may be formed. Furthermore, at least one transverse rib part 1430, which may be integrally connected to the longitudinal rib part and may extend in the transverse direction, may be formed between two second longitudinal rib parts 1420 or between two first longitudinal rib parts 1410.

FIGS. 3 and 4 illustrate an example in which one transverse rib part 1430 is included. FIG. 3 illustrates an example of a structure in which the transverse rib part 1430 extends a short distance between the two second longitudinal rib parts 1420. FIGS. 4A to 4C illustrate an example of a structure in which the transverse rib part 1430 extends a longer distance between the two first longitudinal rib parts 1410.

Figure 10A:
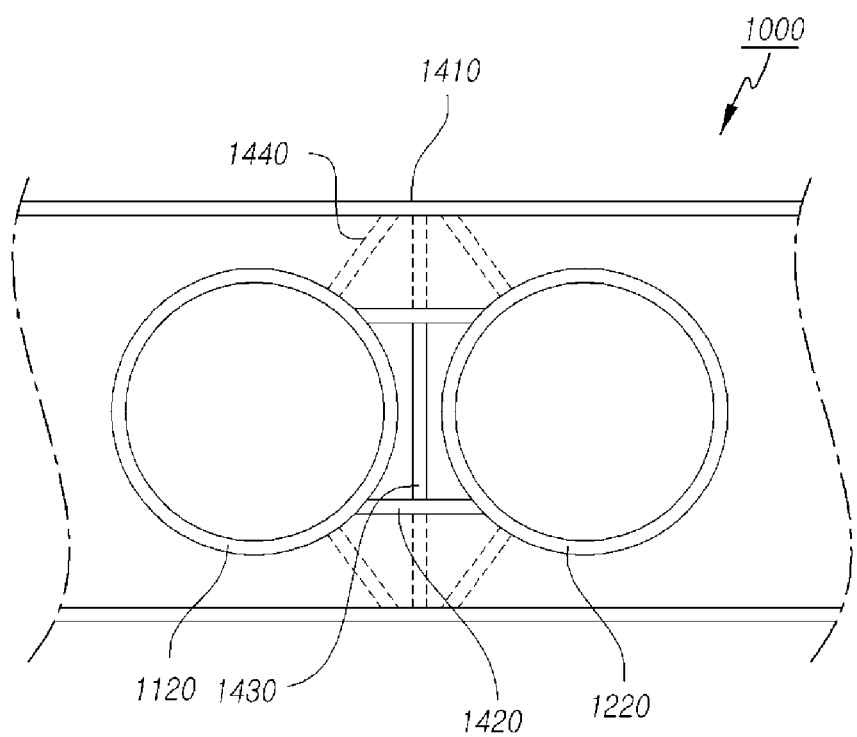
FIG. 10A illustrates an the actuator fixing device having a rib part according to an embodiment of the present disclosure.

Also, as shown, e.g., in FIGS. 4B and 10A, one or more diagonal rib parts 1440 that extend diagonally may be further formed between the first support part or the second support part and the first longitudinal rib part 1410. Thus, in the actuator fixing device 1000 according to an embodiment of the present disclosure, the reinforcing rib part including a plurality of rib parts extending in the longitudinal direction, the transverse direction, and the diagonal direction may be formed to strongly support two actuators, even if the two actuators vibrate strongly for a long time. As a result, it is possible to prevent deformation of the actuator fixing device and to reduce a change in the relative position between the two actuators and the display panel. Accordingly, it is possible to reduce a change in the sound characteristics due to the long-time operation, and the experimental result will be described in more detail with reference to FIG. 10.

As described above, the reinforcing rib part 1400 formed in the actuator fixing device according to an embodiment of the present disclosure should include one or more longitudinal rib parts arranged in the longitudinal direction connecting the two actuators. Furthermore, if the reinforcing rib part 1400 is asymmetric, the difference in the amount of deflection of the actuator fixing device may occur at a high temperature or at a low temperature, so that the sound characteristics may be deteriorated. Therefore, the reinforcing rib portion 1400 according to an embodiment of the present disclosure may preferably be symmetrical in all directions.

As described above, when a thin diaphragm (e.g., paper, PP, or the like) is used for a generic speaker, the sound pressure will be sufficient. However, when the display panel is used as a diaphragm as described in an embodiment of the present disclosure, the sound pressure may be reduced due to the weight and thickness of the display panel. Therefore, it may be difficult to commercialize the display device.

Therefore, in a display panel direct-vibration type display device, a structure is proposed in which a plurality of actuators, which are controlled in the same way, are connected in series to increase the sound pressure. However, when the plurality of actuators are simply disposed in series, it is difficult to uniformly maintain the contact characteristics between the actuator and the display panel, and the sound quality is deteriorated due to a delay phenomenon and interference between the actuators.

Therefore, an embodiment of the present disclosure may provide the actuator fixing device that is a device for fixing and supporting two or more actuators to be adjacent each other, and fixing the actuators to the cover bottom, which may be a rear support structure of the display device, to solve the issues described above. In this case, it may have a structure in which the first support part 1120 and the second support part 1220 support only some parts of the rear surfaces of the first actuator 200 and the second actuator 200', respectively, and the center portions of the rear surfaces of the first actuator 200 and the second actuator 200' may be exposed to the outside of the actuator fixing device 1000. That is, as shown in FIG. 4A, the distal ends of the protruding parts of the first support part 1120 and the second support part 1220 may be slightly bent inward to support only a part of the rear surface of each actuator, so that the center portions of the rear surfaces of the actuators 200, 200' may be exposed to the outside.

As shown in FIG. 2B, a gap of the air gap space 600 between the display panel 100 and the cover bottom 300 is extremely small, e.g., about 0.9 mm or less, due to the recent tendency of the display device to be as thin as possible. On the other hand, in the structure of the present disclosure in which the display panel is vibrated so that sound waves are generated, the compression and relaxation characteristics of the air in the air gap space may affect the vertical vibration of the actuator, and such an influence becomes large when the air gap space is small. That is, due to the narrow air gap space, the compression and relaxation characteristics of the air restricts the vertical vibration motion of the actuator, so that an air damping phenomenon may occur, which is a phenomenon in which the operational performance of the actuator is deteriorated.

Accordingly, in an embodiment of the present disclosure, the first support part 1120 and the second support part 1220 may support only some parts of the rear surfaces of the first actuator 200 and the second actuator 200', respectively, to have a so-called "open" structure in which the rear central portions of the first actuator 200 and the second actuator 200' are exposed to the outside of the actuator fixing device. Therefore, it is possible to provide an effect of suppressing the air damping phenomenon described above by increasing the amount of deficient air in the air gap space.

Figure 5:
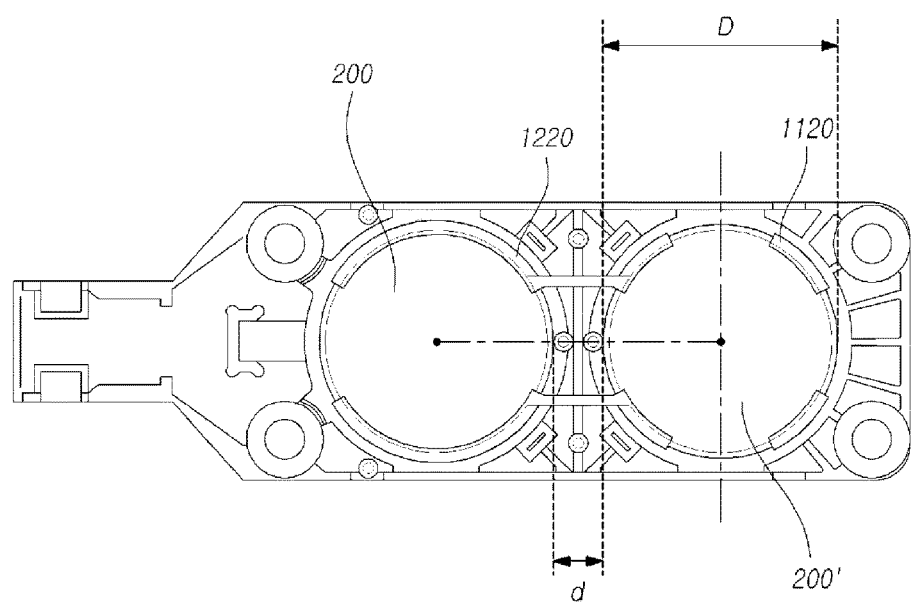
FIG. 5 illustrates a distance (d) between two actuators in an actuator fixing device according to an embodiment of the present disclosure.

Furthermore, because a distance between two actuators in the actuator fixing device 1000 according to an embodiment of the present disclosure affects the characteristics of the generated sound, the distance between the two actuators or distance (d) between the first support part and the second support part should be optimized. As shown in FIG. 5, for forming the reinforcing rib part, distance (d) defined as the shortest distance between the first support part 1120 and the second support part 1220 should be greater than a smallest distance and may be preferably smaller than a maximum distance value, which is the size of the first actuator 200 and/or the second actuator 200'.

In more detail, the smaller the distance (d) between the first support part 1120 and the second support part 1220 is, the better the sound quality characteristics. However, to secure the minimum thickness for the reinforcing rib part to function, the distance (d) between the first support part 1120 and the second support part 1220 should be greater than the smallest distance, e.g., about 7 mm in the experimental example.

Also, according to experimental results, it is confirmed that, when the distance (d) between the first support part 1120 and the second support part 1220 is greater than the smallest distance value, the sound quality characteristics is somewhat changed. However, the change in the sound quality characteristic is not significant until the spaced distance (d) between the first support part 1120 and the second support part 1220 is smaller than or equal to the size D of the actuator, and when the spaced distance (d) between the first support part 1120 and the second support part 1220 is larger than the size D of the actuator 200 or 200', the sound quality characteristics is drastically reduced.

Therefore, in an embodiment of the present disclosure, the distance (d) between the first support part 1120 and the second support part 1220 of the actuator fixing device 1000 is made smaller than the size D of the actuator, so that the deterioration of sound quality is reduced. The result of this experiment will be described in more detail with reference to FIG. 11 below.

Also, the actuator fixing device 1000 according to an embodiment of the present disclosure may include a plurality of mounting holes for fixing and coupling the actuator to the cover bottom. In the examples of FIGS. 3 and 4, a first mounting hole 1310 to a fourth mounting hole 1340 are formed at four corners of the actuator fixing device 1000, respectively.

In addition, as shown in FIG. 3, the actuator fixing device 1000 may further include a self-clinching nut 330, e.g., a PEM® nut, fixed to the cover bottom 300. The actuator fixing device 1000 can be fixed to the self-clinching nut 330, e.g., the PEM® nut by fixing bolts 320 inserted into the mounting holes 1310 to 1340. Moreover, one side of the self-clinching nut 330 may be inserted, e.g., forcedly, in a self-clinching nut fixing hole formed in the cover bottom 300. Then, a distal end of the self-clinching nut 330 may be coated so that the self-clinching nut 330 may be fixed to the cover bottom 300. Meanwhile, because a screw through hole may be formed in the inner surface of the self-clinching nut 330, the actuator fixing device 1000 can be fixed to the cover bottom 300 by aligning the mounting hole of the actuator fixing device with the screw through hole of the self-clinching nut 330 and then tightening the fixing bolt 320.

The use of such a self-clinching nut 330 has the effect of somewhat preventing a strong vibration of the actuator from being transmitted to the cover bottom. That is, when the actuator fixing device 1000 is directly coupled to the cover bottom 300 without the self-clinching nut 330, a strong vibration generated in operating of the actuator may be transmitted to the cover bottom 300 for a long time, and as a result, the cover bottom 300, which is relatively thin, may be bent or deformed. On the other hand, when the self-clinching nut 330 is used, as in an embodiment of the present disclosure, the vibration generated in the actuator may be absorbed by the self-clinching nut. As a result, the vibration transmitted to the cover bottom can be reduced.

Further, when the self-clinching nut 330 is used, there is an advantage in that a concern, in which a fixing force is not sufficient because the cover bottom is thin when the fixing bolt is directly screwed to the cover bottom, is solved. That is, when there is no self-clinching nut 330, the fixing bolt 320 passing through a screw hole formed in the mounting hole of the actuator fixing device 1000 should be screwed directly to the screw hole formed in the cover bottom 300. In this case, there is no concern in the coupling when the thickness of the cover bottom 300 is large, but when the thickness of the cover bottom 300 is small, there is an issue in that a coupling force may not be sufficient. Therefore, if the self-clinching nut 330 is fixed to the cover bottom 300 in advance, e.g., in a press fit/caulking manner as described above, and then the actuator fixing device 1000 is coupled to the self-clinching nut 330, a sufficient coupling force can be ensured, even when the thickness of the cover bottom 300 is small.

Hereinafter, a detailed structure of the actuator that can be used in an embodiment of the present disclosure and the principle of generating sound by the vibration of the actuator will be described in detail.

Figure 6:
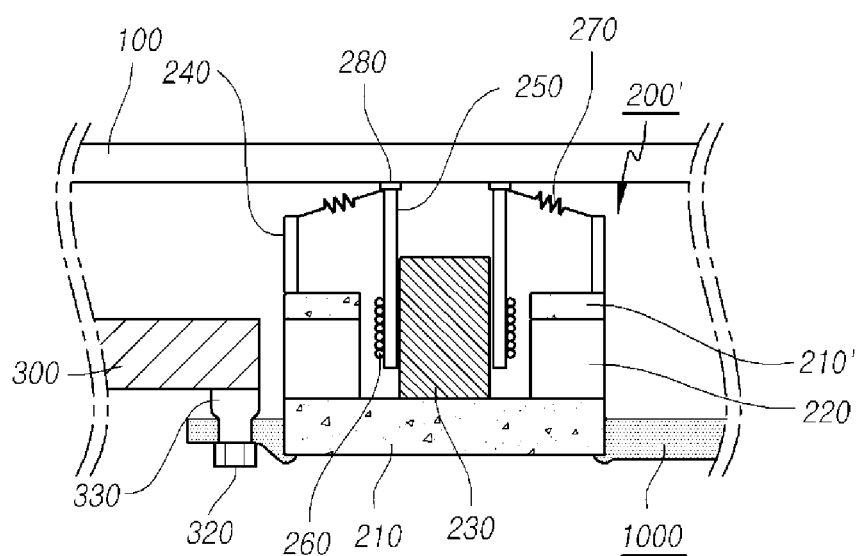
FIG. 6 is a sectional view illustrating an example of a structure of a sound-generating actuator used in an embodiment of the present disclosure.

FIG. 6 is a sectional view illustrating an example of a structure of a sound-generating actuator used in an embodiment of the present disclosure. FIG. 7 illustrates a state in which a sound-generating actuator that can be used in an embodiment of the present disclosure vibrates a display panel to generate sound.

The first sound-generating actuator 200 and the second sound-generating actuator 200' used in an embodiment of the present disclosure may have the same structure. Hereinafter, the first sound-generating actuator 200, which is one of the first and second sound-generating actuators 200 and 200', will be described as an example.

The sound-generating actuator 200 used in an embodiment of the present disclosure may include a magnet 220 as a permanent magnet, plates 210, 210' for supporting the magnet 220, a center pole 230 protruding in a central area of the plate 210, a bobbin 250 surrounding the center pole 230, and a coil 260 wound around the bobbin 250 and to which a current for generating sound is applied.

Embodiments of the sound-generating actuator may include both a first type of structure in which the magnet is disposed on the outer side of the coil, and a second type of structure in which the magnet is disposed on the inner side of the coil. FIG. 6 illustrates an example of the first type of structure in which the magnet is disposed on the outer side of the coil.

The sound-generating actuator according to the first type of structure may be referred to as an "external" magnet type actuator. A lower plate 210 may be received and fixed to the first support part 1120 of the actuator fixing device 1000. The magnet 220, which may be an annular permanent magnet, may be on the outer periphery of the lower plate 210. An upper plate 210' may be on the upper portion of the magnet 220. An outer frame 240 protruding from the upper plate 210' may be on the outer periphery of the upper plate 210'.

The center pole 230 may protrude from the central area of the lower plate 210. The bobbin 250 surrounding the center pole 230 may be on the central area of the lower plate 210. The coil 260 may be wound around the lower portion of the bobbin 250. A current for generating sound may be applied to the coil 260. A damper 270 may be disposed between a part of the upper portion of the bobbin 250 and the outer frame 240.

As shown in the FIG. 3 example, the lower plate 210 may have a circular shape, the magnet 220 may be on the lower plate 210 in a ring shape, and the upper plate 210' may be on the magnet 220. The plates 210 and 210' may be formed of magnetic material, such as iron (Fe). The plates 210, 210' are not limited by the term "plate," but may be expressed by other terms as understood by one of ordinary skill in the art, such as a "yoke." The center pole 230 and the lower plate 210 may be integrally formed.

The bobbin 250 may be a ring-shaped structure formed of, e.g., paper or an aluminum sheet. The coil 260 may be wound around a certain portion of the lower area of the bobbin 250. The bobbin 250 and coil 260 may be combined to be referred to as a "voice coil."

When an electric current is applied to the coil 260, a magnetic field is formed around the coil 260. Because there is an external magnetic field formed by the magnet 220, the entire bobbin 250 may move to an upper side while being guided by the center pole 230, e.g., according to Fleming's right-hand rule. On the other hand, because a distal end of the bobbin 250 may be in contact with the rear surface of the display panel 100, the display panel 100 may be vibrated according to the current application and non-application states, and sound waves may be generated by the vibration. A sintered magnet, such as barium ferrite, may be used as the magnet 220. The material thereof may be ferric oxide ($Fe_2O_3$) and barium carbonate ($BaCO_3$). An alloy cast magnet, e.g., of strontium ferrite having improved magnetic force components, aluminum (Al), nickel (Ni), and cobalt (Co) may be used. The present disclosure is not limited to these examples.

On the other hand, the damper 270 may be disposed between a part of the upper portion of the bobbin 250 and the outer frame 240. The damper 270 may have a corrugated structure, and may adjust a vertical vibration of the bobbin 250 while contracting and relaxing in accordance with a vertical motion of the bobbin 250. That is, because the damper 270 may be connected to the bobbin 250 and the outer frame 240, the vertical vibration of the bobbin 250 may be limited by a restoring force of the damper 270. For example, when the bobbin 250 vibrates at a particular height or more or vibrates at a particular height or less, the bobbin 250 can be restored to its original position by the restoring force of the damper 270. Such a damper 270 may be expressed by other terms. such as an "edge."

Also, a vibration-transmission member 280 for bonding the bobbin 250 and the display panel 100 and transmitting the vibration of the bobbin 250 to the display panel 100 may be disposed at the distal end of the bobbin 250. The vibration-transmission member 280 may be a plate-shaped member in a ring shape, and adhesive surfaces may be formed on both sides thereof. One surface of the vibration-transmission member 280 may be adhered to the distal end of the bobbin 250, and the other surface the vibration-transmission member 280 may be adhered to the display panel 100.

The actuator used in an embodiment of the present disclosure is not limited to the external magnet type actuator as shown in the FIG. 6 example. For example, a micro-type or internal magnet type actuator may be used in which the magnet may be disposed inside the coil. In the actuator according to the internal magnetic type, a magnet may be disposed in the central area of the lower plate, and a center pole may be formed to protrude above the magnet. An upper plate may protrude from the outer periphery of the lower plate, and the outer frame may be disposed on the outer portion of the upper plate. A bobbin may be disposed to surround the periphery of the magnet and the center pole, and a coil may be wound around the outer periphery of the bobbin.

Also, the sound-generating actuator used in the display device according to an embodiment of the present disclosure is not limited to the form shown in the FIG. 6 example. Another type of actuator that can vertically vibrate the display panel according to the application of a current to generate sound may be used.

Figure 7A:
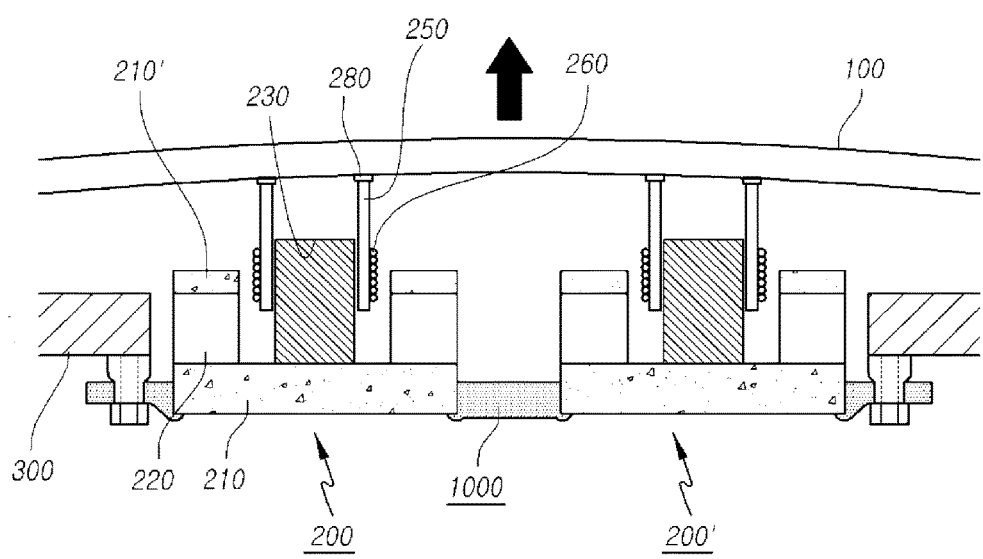
FIGS. 7A and 7B illustrate states in which a sound-generating actuator, which can be used in an embodiment of the present disclosure, vibrates a display panel to generate sound.
Figure 7B:
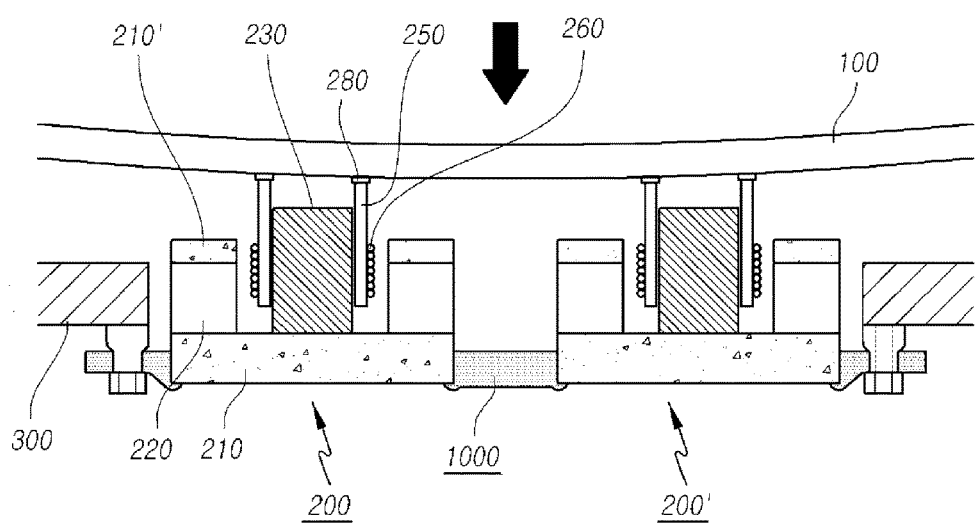

FIGS. 7A and 7B illustrate states in which a sound-generating actuator, which can be used in an embodiment of the present disclosure, vibrates a display panel to generate sound.

FIG. 7A shows a state in which a current is applied. The center pole 230 connected to the lower surface of the magnet 220 may serve as an N pole, and the upper plate 210' connected to the upper surface of the magnet 220 may serve as an S pole, so that an external magnetic field is formed between the coils 260.

In the illustrated state of FIG. 7A, when a current for generating sound is applied to the coil 260, an applied magnetic field is generated around the coil 260, and a force for moving the bobbin 250 upward is generated due to the applied magnetic field and the external magnetic field. Therefore, as shown in the FIG. 7A example, the bobbin 250 may move upward, and the display panel 100 in contact with the distal end of the bobbin 250 may vibrate upward (see the arrow direction of FIG. 7A). When the current application is stopped or a current in the opposite direction is applied in this state, a force for moving the bobbin 250 downward is generated according to a similar principle as shown in FIG. 7B. Therefore, the display panel 100 vibrates downward (see the arrow direction of FIG. 7B). Thus, the display panel 100 may vibrate up and down according to the current application direction and size to the coil 260, and sound waves may be generated by the vibration.

Figure 8:
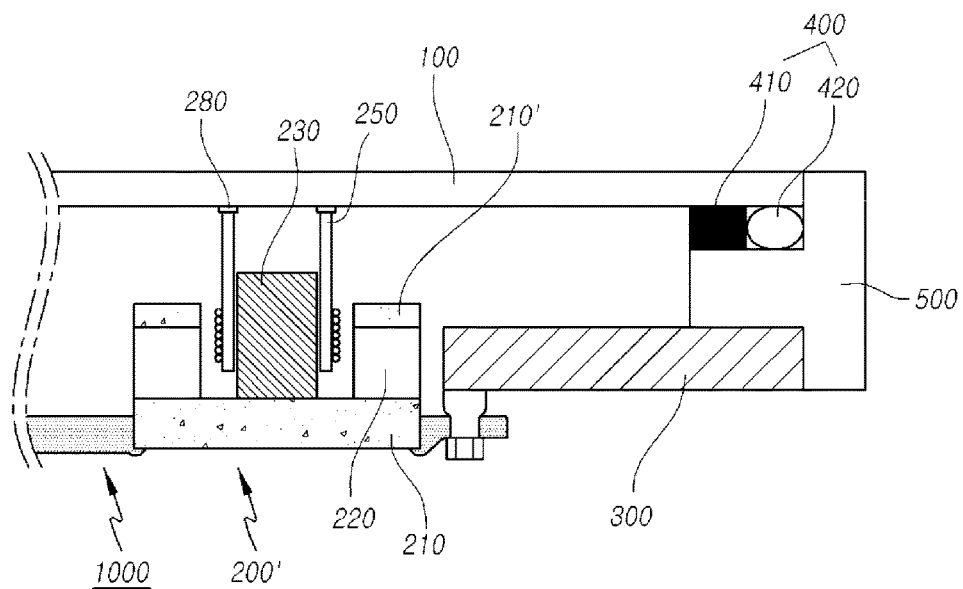
FIG. 8 illustrates a structure of a baffle part disposed between a display panel and a support structure in a display device according to an embodiment of the present disclosure.

FIG. 8 illustrates a structure of a baffle part disposed between a display panel and a cover bottom that is a support structure in a display device according to an embodiment of the present disclosure.

In the panel vibration type sound-generating device according to an embodiment of the present disclosure, a space or an air gap 600, which is a space in which the panel can vibrate by the sound-generating actuator 200, should be secured between the display panel 100 and the support structure (e.g., the cover bottom 300, or the like). Also, one side of the display panel should be joined to the support structure of the display panel so that sound waves can be generated when the display panel is vibrated. In some embodiments, the generated sound should not leak to the outside through the side surface of the display device. For this purpose, in the display device according to an embodiment of the present disclosure, a constant baffle part 400 may be formed between the lower surface of the display panel 100 and the cover bottom 300 that is the support structure.

In more detail, a constant compartment or a constant area (that is, a space or an air gap space) around the sound-generating actuator 200' may be defined, and the baffle part 400 may be disposed between the lower surface of the display panel 100 and the upper surface of the middle cabinet 500 or the cover bottom 300 at an edge of the compartment or the area. The baffle part 400 may include an adhesive member 410, such as a double-sided tape, adhered between the lower surface of the display panel 100 and the upper surface of the support structure of the display device. A sealing part 420 may be further disposed on the outer periphery of the adhesive member 410. In this case, a compartment or an area in which the baffle part 400 is formed may be the entire display panel area defined by four sides of the outer periphery of the display panel 100, but embodiments are not limited thereto.

As shown in FIG. 8, the support structure of the display device may further include a middle cabinet 500 coupled to the cover bottom 300 and for safely seating a part of the display panel 100, in addition to the cover bottom 300 for covering the entire rear surface of the display panel 100. The middle cabinet 500 may be a frame-shaped member formed along the outer periphery of the display panel 100. The middle cabinet 500 may have a generally T-shaped cross-sectional shape, e.g., by including a horizontal support part on which a part of the display panel is safely seated and a vertical support part which is bent in both directions from the horizontal support part to cover the side surfaces of the cover bottom 300 and the side surfaces of the display panel 100. The middle cabinet 500 may configure the side exterior of the display device or the set device, but may be optional in some cases, or may be integrally formed with the cover bottom 300.

According to the embodiment of FIG. 8, the adhesive member 410 constituting the baffle part 400 may be, e.g., a double-sided tape, disposed between the upper surface of the horizontal support part of the middle cabinet 500 and the display panel 100. The adhesive member 410 may function to adhere and fix the lower surface of the display panel 100 to the middle cabinet 500.

Also, the sealing part 420 constituting the baffle part 400 may be further disposed on the outer periphery of the adhesive member 410, and may have an uncompressed thickness or height greater than an uncompressed thickness or height of the adhesive member 410. The sealing part 420 may be formed of a material, such as rubber, having high elasticity, and may have an uncompressed thickness that is larger than an uncompressed thickness of the adhesive member 420.

That is, as shown in the FIG. 8 example, one surface of the adhesive member 410, which may be a double-faced tape having a particular uncompressed thickness, may be adhered and disposed on the inner portion of the upper surface of the horizontal support part of the middle cabinet 500. The sealing part 420 of an elastic material, having an uncompressed thickness greater than the particular uncompressed thickness of the adhesive member 410, may be disposed on the outer periphery of the adhesive member 410.

In this state, when the display panel 100 is attached to the other bonding surface of the adhesive member 410, the sealing part 420 having a larger uncompressed thickness may be pressed to a certain degree, thereby bonding the display panel 100 and the middle cabinet 500. Therefore, the sealability of the air gap area around the sound-generating actuator can be further improved.

As a result, the display panel 100 and the cover bottom 300 may be coupled to each other by forming an air gap or a space 600 as large as the particular uncompressed thickness of the adhesive member 410 and the horizontal support part of the middle cabinet 500, as shown in example of FIG. 8, so that it is possible to secure a vibration space in which the display panel 100 can generate sound and to prevent sound waves generated inside from flowing out to the outside along the side surface of the display device.

For example, the baffle part 400 disposed at the edge of the air gap space may have a double structure of the adhesive member 410 and the sealing part 420. The sealing part may have a larger uncompressed thickness, thereby further improving the sealability of the air gap space to further block the leakage of sound.

It should be understood that the middle cabinet 500 may be replaced in embodiments by other structures, such as a guide panel, a plastic chassis, a p-chassis, a support main, a main support, and a mold frame, and may include any type of structure that is connected to the cover bottom and used to support the display panel and baffle part, e.g., as a square frame-shaped structure having a cross-sectional shape with a plurality of bent portions.

Meanwhile, as described above, the middle cabinet 500 may be used to support between the cover bottom and the display panel. However, such a middle cabinet 500 may not be a necessary structure, i.e., it may be optional. When the middle cabinet is not used, the baffle part described above may be disposed between the upper surface of the cover bottom 300 and the lower surface of the display panel.

Figure 9A:
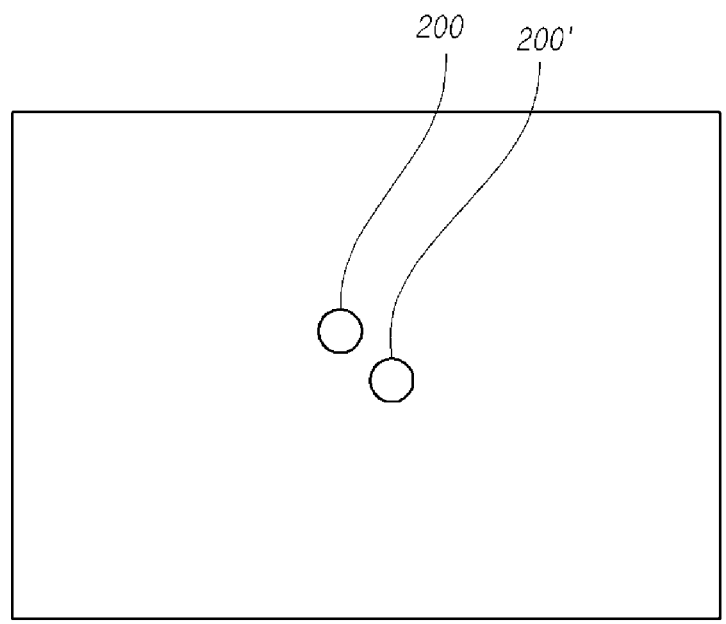
FIGS. 9A and 9B are views for explaining the sound output characteristics in the case where a sound-generating actuator fixing device is used according to an embodiment of the present disclosure.
Figure 9B:
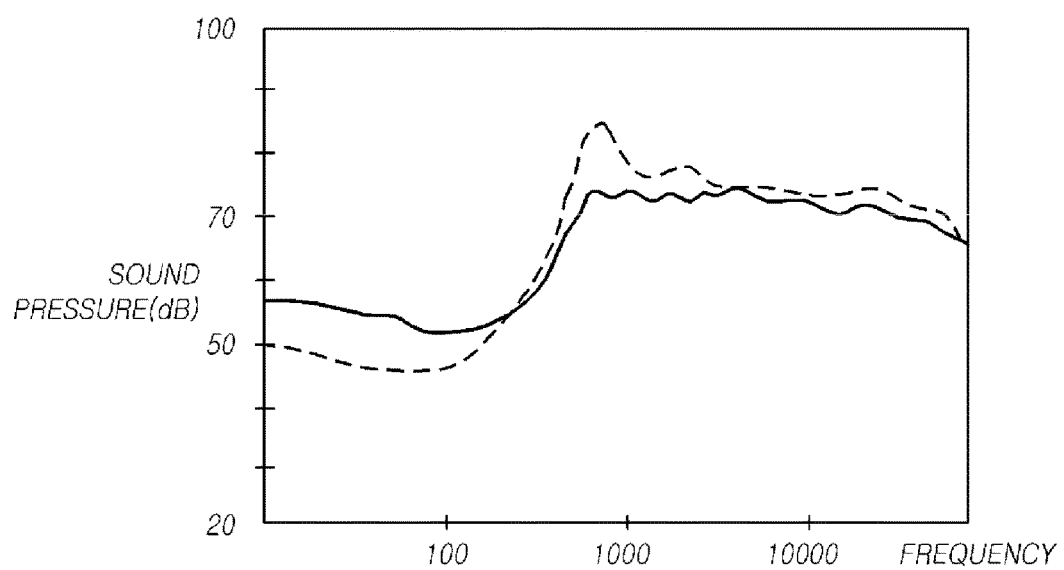

FIGS. 9A and 9B are views for explaining the sound output characteristics in a case in which a sound-generating actuator fixing device is used according to an embodiment of the present disclosure. FIG. 9A illustrates an actuator mounting configuration compared to an embodiment of the present disclosure. FIG. 9B is a graph in which the mounting configuration of FIG. 9A is compared to the sound output characteristics in an embodiment of the present disclosure.

As described above, in the display device for generating sound by directly vibrating the display panel, a structure may be adopted in which two or more sound-generating actuators having the same characteristics are disposed adjacent to each other to increase the sound pressure.

FIG. 9A is a structure in which two actuators 200, 200' are simply disposed adjacent to each other without an actuator fixing device (e.g., the actuator fixing device 1000) according an embodiment of the present disclosure. The dotted line in FIG. 9B shows a case in which two actuators are adjacent to each other and are separately fixed without a separate actuator fixing device, and a dip phenomenon occurs in which the sound pressure drastically increases in a 800 to 900 Hz band. Such a dip phenomenon is caused by a strong sound pressure at a specific frequency due to interference between sound waves generated in an actuator that is individually fixed and a delay phenomenon, and is recognized as a decrease in the overall sound quality.

On the other hand, the solid line in FIG. 9B shows the sound output characteristics in a case in which the actuator fixing device 1000 for fixing the two actuators integrally is used according to an embodiment of the present disclosure, and it may be seen that the dip phenomenon, in which the sound pressure abnormally increases at a certain frequency, is considerably eliminated. As described above, when the actuator fixing device 1000 according to an embodiment of the present disclosure is used, the uniform sound pressure can be generated in the entire frequency band and improved sound output characteristics can be realized.

FIG. 10A illustrates an the actuator fixing device having a rib part according to an embodiment of the present disclosure.

As shown in FIG. 10A, the actuator fixing device 1000 according to an embodiment of the present disclosure may include a reinforcing rib portion 1400. The reinforcing rib portion 1400 may include at least one of two first longitudinal rib parts 1410, two second longitudinal rib parts 1420, a transverse rib part 1430, and a diagonal rib portion 1440.

Figure 10B:
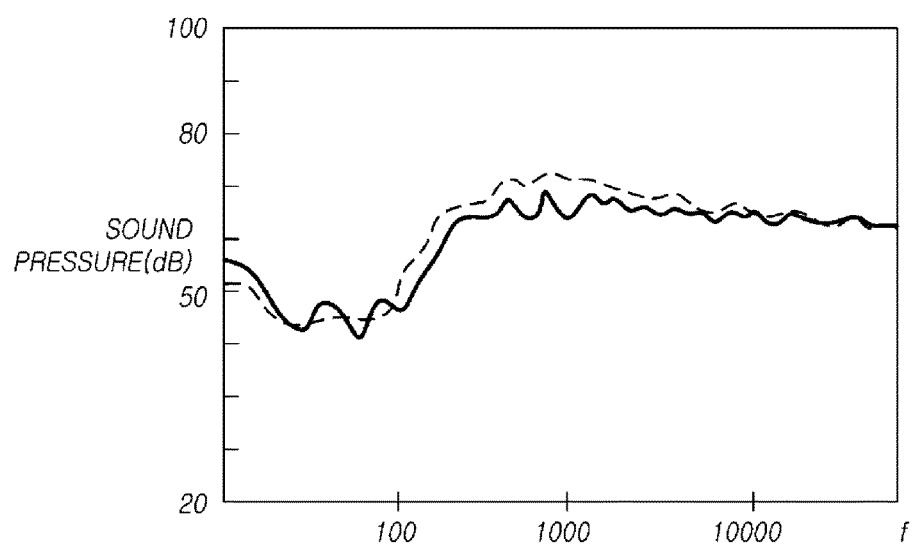
FIGS. 10B and 10C are graphs showing an effect over time in a case in which a rib part of an actuator fixing device is used according to an embodiment of the present disclosure.
Figure 10C:
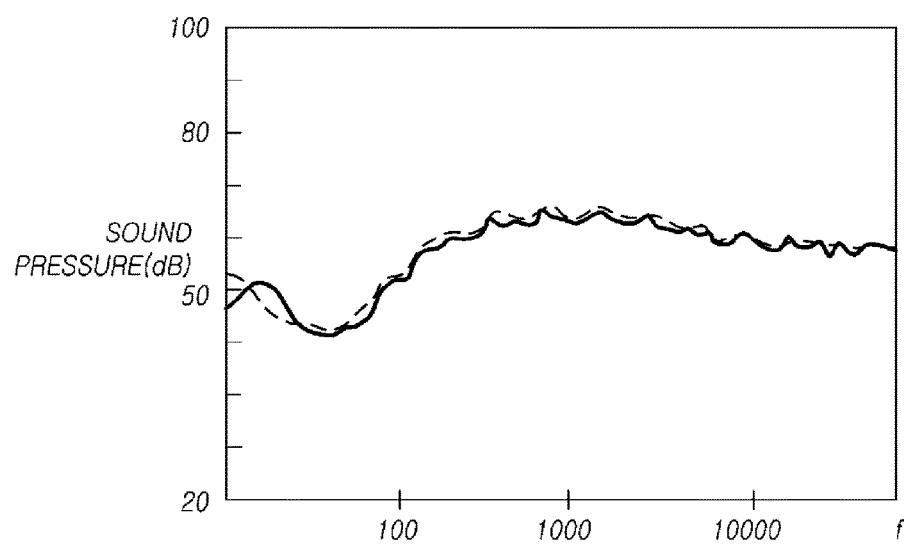

FIGS. 10B and 10C are graphs showing an effect over time in a case in which a rib part of an actuator fixing device is used according to an embodiment of the present disclosure.

FIG. 10B shows the sound output characteristics in a case in which an actuator fixing device including only a first support part and a second support part for simply fixing two actuators is used without the reinforcing rib portion according to an embodiment of the present disclosure. The dotted line in FIG. 10B shows the initial sound output characteristics. The solid line FIG. 10B shows the sound output characteristics after 240 hours or more of operation.

As shown in FIG. 10B, when the reinforcing rib part according to an embodiment of the present disclosure is not used, it may be seen that the sound output characteristics change as the operation time elapses. This may be because the actuator fixing device may be deformed by the actuator vibration after a long time.

On the other hand, FIG. 10C shows a case in which the actuator fixing device including the reinforcing rib part according to an embodiment of the present disclosure is used. Even when the operation time of 240 hours or more elapses (the solid line in FIG. 10C), the initial sound output characteristics are maintained almost unchanged as compared to the initial sound output characteristics (the solid line in FIG. 10B).

As described above, in the actuator fixing device 1000 according to an embodiment of the present disclosure, the reinforcing rib part including a plurality of rib parts extending in the longitudinal direction, the transverse direction, and the diagonal direction may be formed. Therefore, even if two actuators vibrate strongly for a long time, it is possible to maintain the rigidity of the actuators and to reduce a change in a relative position between the two actuators and the display panel. As a result, a change in the sound characteristics due to the long-time operation can be reduced.

Figure 11:
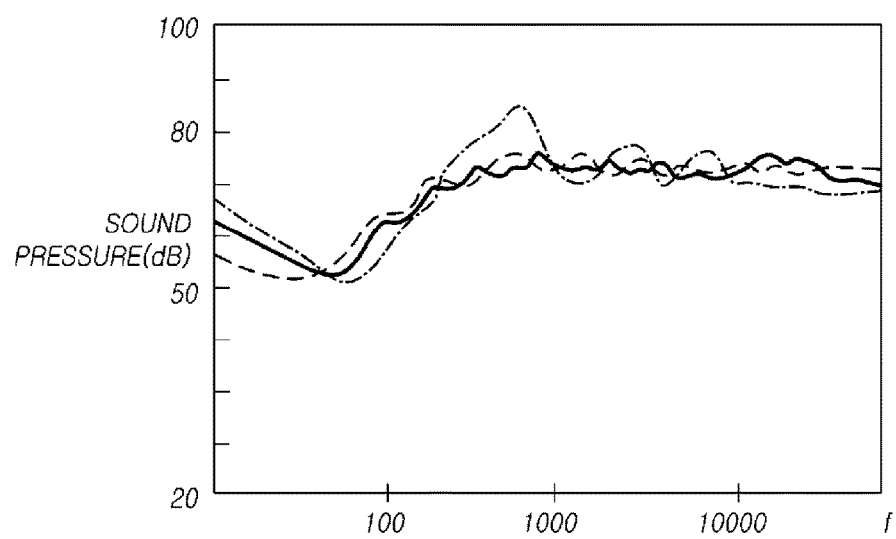
FIG. 11 is a graph showing the sound output characteristics according to a distance (d) between two actuators in an actuator fixing device according to an embodiment of the present disclosure.

FIG. 11 is a graph showing the sound output characteristics according to a distance (d) between two actuators in an actuator fixing device according to an embodiment of the present disclosure.

As shown in the FIG. 5 example and as described above, when the size (diameter) of the first actuator 200 and the second actuator 200' is D, the distance (d), which is the smallest distance between the first support part 1120 and the second support part 1220, should be greater than the smallest distance of, e.g., about 7 mm, for forming the reinforcing rib part, and smaller than the size D of the actuator. FIG. 11 is provided for explaining the reason for this effect.

As shown by the dotted line in FIG. 11, when the distance (d), which is the smallest distance between the first support part 1120 and the second support part 1220, which was about 7 mm in the experimental example, improved sound output characteristics having a uniform sound pressure in the entire frequency band may be obtained, and the sound output characteristics are changed as the distance (d) increases. However, a change of the sound quality characteristic is not large when the spaced distance (d) is about 0.85*D (e.g., about 23.6 mm), as shown in solid line, which is slightly smaller than about 28 mm, which is the size D of the actuator used in the experimental example.

On the other hand, when the distance (d), which is the smallest distance between the first and second support parts 1120, 1220, becomes larger than the size D (e.g., about 28 mm) of the actuator and becomes about 30 mm (e.g., about 1.1*D), as shown in the alternating long and short dash line, it may be seen that a dip phenomenon occurs in which the sound pressure increases at a specific frequency. Accordingly, the distance (d) between the first support part 1120 and the second support part 1220 of the actuator fixing device 1000 according to embodiments should be smaller than the size D of the actuator, thereby maintaining the improved sound output characteristics.

As described above, an embodiment of the present disclosure provides, in configuring the display device including the panel vibration type sound-generating device, an actuator fixing device which has a fixing structure including two sound-generating actuators adjacently inserted and fixed in a support hole formed in a support structure of the display device, thereby reducing the thickness of the display device while generating improved sound with high sound pressure.

Further, an embodiment of the present disclosure provides an actuator fixing device for supporting two sound-generating actuators to be adjacent to each other, and a reinforcing rib part including a plurality of rib parts between the actuator support parts, so that the strength of an actuator support structure can be maintained even during long-time operation.

Moreover, in the actuator fixing device for supporting the two sound-generating actuators to be adjacent to each other, a distance (d), which is the smallest distance between two actuator support parts, is limited to a certain range in relation to the size of each actuator, so that the sound pressure can be increased while maintaining the sound characteristics in the entire frequency band.

According to one or more example embodiments of the present disclosure, a display device may include a display panel configured to display an image, a cover bottom configured to cover the display panel, and a plurality of sound-generating actuators supported by the cover bottom, the sound-generating actuators being configured to vibrate the display panel to generate sound, at least two of the sound-generating actuators being adjacent to each other.

According to one or more example embodiments of the present disclosure, the display device may further include an actuator fixing device configured to support the at least two sound-generating actuators to be adjacent to each other.

According to one or more example embodiments of the present disclosure, the actuator fixing device may be further configured to fix the sound-generating actuators to the cover bottom.

According to one or more example embodiments of the present disclosure, the actuator fixing device may include a first support part configured to support a first actuator, a second support part configured to support a second actuator, and a reinforcing rib part adjacent to the first support part and to the second support part.

According to one or more example embodiments of the present disclosure, the reinforcing rib part may include a first longitudinal rib part extending in a longitudinal direction at an outer periphery of the first support part and the second support part, a second longitudinal rib part connecting the first support part and the second support part in the longitudinal direction, and a transverse rib part extending perpendicularly to the second longitudinal rib part.

According to one or more example embodiments of the present disclosure, the reinforcing rib part may include one or more diagonal rib parts that extend diagonally relative to a side of the display panel.

According to one or more example embodiments of the present disclosure, each of the first support part and the second support part may support a part of the rear surface and a side surface of the first actuator and the second actuator, and the central portions of the rear surfaces of the first actuator and the second actuator may be exposed to the outside of the actuator fixing device.

According to one or more example embodiments of the present disclosure, a distance between the first support part and the second support part may be smaller than a size of the first actuator or a size of the second actuator.

According to one or more example embodiments of the present disclosure, a distance between first actuator and the second actuator may be smaller than a size of the first actuator or a size of the second actuator.

According to one or more example embodiments of the present disclosure, the display device may further include a self-clinching nut fixed to the cover bottom, the actuator fixing device may further comprise a plurality of mounting holes for fixing the actuator fixing device to the cover bottom, and the actuator fixing device may be fixed to the self-clinching nut by a fixing bolt in the mounting hole.

According to one or more example embodiments of the present disclosure, the sound-generating actuator may include a lower plate, a magnet on the lower plate, a center pole at the center of the lower plate, a bobbin surrounding the center pole, and a coil wound around the bobbin.

According to one or more example embodiments of the present disclosure, an apparatus may include a display panel configured to display an image, a plurality of sound-generating actuators configured to vibrate the display panel to generate sound, a cover bottom configured to cover the display panel, and an actuator fixing device for fixing at least two of the sound-generating actuators to the cover bottom.

According to one or more example embodiments of the present disclosure, the at least two of the sound-generating actuators may be at least partially between the display panel and the actuator fixing device.

According to one or more example embodiments of the present disclosure, the actuator fixing device may include a first support part configured to support a first actuator, a second support part configured to support a second actuator, and a reinforcing rib part adjacent to the first support part and the second support part.

According to one or more example embodiments of the present disclosure, the reinforcing rib part may include a first longitudinal rib part extending in a longitudinal direction at an outer periphery of the first support part and the second support part, a second longitudinal rib part connecting the first support part and the second support part in the longitudinal direction, and a transverse rib part extending perpendicularly to the second longitudinal rib part.

According to one or more example embodiments of the present disclosure, the actuator fixing device may include a reinforcing rib part comprising one or more diagonal rib parts that extend diagonally relative to a side of the display panel.

According to one or more example embodiments of the present disclosure, each of the first support part and the second support part may support a part of the rear surface and a side surface of a first actuator and a second actuator, and the central portions of the rear surfaces of the first actuator and the second actuator may be exposed to the outside of the actuator fixing device.

According to one or more example embodiments of the present disclosure, a distance between the first support part and the second support part may be smaller than a size of the first actuator or a size of the second actuator.

According to one or more example embodiments of the present disclosure, the actuator fixing device may further include a plurality of mounting holes for fixing the actuator fixing device to the cover bottom.

According to one or more example embodiments of the present disclosure, a distance between first actuator and the second actuator may be smaller than a size of the first actuator or a size of the second actuator.

According to one or more example embodiments of the present disclosure, an apparatus may include a display panel configured to display an image, a plurality of sound-generating actuators configured to vibrate the display panel to generate sound, and a reinforcing rib part configured to maintain a distance between at least two of the sound-generating actuators.

According to one or more example embodiments of the present disclosure, the reinforcing rib part may include a first longitudinal rib part extending in a longitudinal direction, a second longitudinal rib part in the longitudinal direction, and a transverse rib part extending perpendicularly to the second longitudinal rib part.

According to one or more example embodiments of the present disclosure, the reinforcing rib part may include one or more diagonal rib parts that extend diagonally relative to a side of the display panel.

According to one or more example embodiments of the present disclosure, an apparatus may include a display panel configured to display an image, and a plurality of sound-generating actuators configured to vibrate the display panel to generate sound, the plurality of sound-generating actuators including at least a first sound-generating actuator and a second sound-generating actuator, a distance between the first sound-generating actuator and the second sound-generating actuator is smaller than a diameter of the first sound-generating actuator or a diameter of the second sound-generating actuator.

According to one or more example embodiments of the present disclosure, the distance between the first sound-generating actuator and the second sound-generating actuator may be less than 28 mm According to one or more example embodiments of the present disclosure, the first sound-generating actuator and the second sound-generating actuator may be configured to receive a same control signal for vibrating the display panel.

According to one or more example embodiments of the present disclosure, the apparatus may further include a reinforcing rib part configured to maintain a distance between the first sound-generating actuator and the second sound-generating actuator.

According to one or more example embodiments of the present disclosure, the reinforcing rib part may include a first longitudinal rib part extending in a longitudinal direction, a second longitudinal rib part in the longitudinal direction, and a transverse rib part extending perpendicularly to the second longitudinal rib part.

According to one or more example embodiments of the present disclosure, the reinforcing rib part may include one or more diagonal rib parts that extend diagonally relative to a side of the display panel.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A display device, comprising:
a display panel configured to display an electronic image, the display panel including a rear side;
a cover bottom configured to cover the rear side of the display panel;
a plurality of sound-generating actuators fixed to and supported by the cover bottom, the plurality of sound-generating actuators being configured to directly contact and directly vibrate the display panel to generate sound; and
an actuator fixing device configured to support a first actuator and a second actuator, among the plurality of sound-generating actuators, to be at a certain distance from each other,
wherein the actuator fixing device comprises:
a first support part configured to support the first actuator,
a second support part configured to support the second actuator, and
a reinforcing rib part adjacent to the first support part and to the second support part, and
wherein the reinforcing rib part comprises:
a first longitudinal rib part extending in a longitudinal direction at an outer periphery of the first support part and the second support part,
a second longitudinal rib part connecting the first support part and the second support part in the longitudinal direction, and
a transverse rib part extending perpendicularly to the second longitudinal rib part.

2. The display device of claim 1, wherein the actuator fixing device is further configured to fix the plurality of sound-generating actuators to the cover bottom.

3. The display device of claim 1, wherein the reinforcing rib part comprises one or more diagonal rib parts that extend diagonally relative to a side of the display panel.

4. The display device of claim 1, wherein:
each of the first support part and the second support part supports a part of the rear surface and a side surface of the first actuator and the second actuator; and
the central portions of the rear surfaces of the first actuator and the second actuator are exposed to the outside of the actuator fixing device.

5. The display device of claim 1, wherein a distance between the first support part and the second support part is smaller than a size of the first actuator or a size of the second actuator.

6. The display device of claim 1, further comprising:
a self-clinching nut fixed to the cover bottom,
wherein the actuator fixing device further comprises a plurality of mounting holes for fixing the actuator fixing device to the cover bottom, and
wherein the actuator fixing device is fixed to the self-clinching nut by a fixing bolt in the mounting hole.

7. The display device of claim 1, wherein the sound-generating actuator comprises:
a lower plate;
a magnet on the lower plate;
a center pole at the center of the lower plate;
a bobbin surrounding the center pole; and
a coil wound around the bobbin.

8. An apparatus, comprising:
a display panel configured to display an electronic image, the display panel including a rear side;
a plurality of sound-generating actuators configured to directly contact and directly vibrate the display panel to generate sound;
a cover bottom configured to cover the rear side of the display panel, the plurality of sound-generating actuators being fixed to and supported by the cover bottom; and
an actuator fixing device for fixing at least two of the sound-generating actuators to the cover bottom
wherein the actuator fixing device comprises:
a first support part configured to support a first actuator among the at least two of the sound-generating actuators,
a second support part configured to support a second actuator among the at least two of the sound-generating actuators, and
a reinforcing rib part adjacent to the first support part and to the second support part, and
wherein the reinforcing rib part comprises:
a first longitudinal rib part extending in a longitudinal direction at an outer periphery of the first support part and the second support part,
a second longitudinal rib part connecting the first support part and the second support part in the longitudinal direction, and
a transverse rib part extending perpendicularly to the second longitudinal rib part.

9. The apparatus of claim 8, wherein the at least two of the sound-generating actuators are at least partially between the display panel and the actuator fixing device.

10. The apparatus of claim 9, wherein the actuator fixing device further comprises a plurality of mounting holes for fixing the actuator fixing device to the cover bottom.

11. The apparatus of claim 9, wherein a distance between first actuator and the second actuator is smaller than a size of the first actuator or a size of the second actuator.

12. The apparatus of claim 8, wherein the reinforcing rib part further comprises one or more diagonal rib parts that extend diagonally relative to a side of the display panel.

13. The apparatus of claim 8, wherein:
each of the first support part and the second support part supports a part of the rear surface and a side surface of a first actuator and a second actuator; and the central portions of the rear surfaces of the first actuator and the second actuator are exposed to the outside of the actuator fixing device.

14. The apparatus of claim 8, wherein a distance between the first support part and the second support part is smaller than a size of the first actuator or a size of the second actuator.

15. An apparatus, comprising:
a display panel configured to display an electronic image, the display panel including a rear side;
a cover bottom configured to cover the rear of the display panel;
a plurality of sound-generating actuators fixed to the cover bottom and configured to directly contact and directly vibrate the display panel to generate sound; and
a reinforcing rib part configured to maintain a distance between at least two of the sound-generating actuators,
wherein the reinforcing rib part comprises:
a first longitudinal rib part extending in a longitudinal direction at an outer periphery of a first support part configured to support a first actuator among the at least two of the sound-generating actuators and a second support part configured to support a second actuator among the at least two of the sound-generating actuators,
a second longitudinal rib part connecting the first support part and the second support part in the longitudinal direction, and
a transverse rib part extending perpendicularly to the second longitudinal rib part.

16. The apparatus of claim 15, wherein the reinforcing rib part further comprises one or more diagonal rib parts that extend diagonally relative to a side of the display panel.

17. An apparatus, comprising:
a display panel configured to display an image;
a plurality of sound-generating actuators configured to vibrate the display panel to generate sound; and
a reinforcing rib part configured to maintain a distance between at least two of the sound-generating actuators,
wherein the reinforcing rib part comprises:
a first longitudinal rib part extending in a longitudinal direction;
a second longitudinal rib part in the longitudinal direction; and
a transverse rib part extending perpendicularly to the second longitudinal rib part.

18. An apparatus, comprising:
a display panel configured to display an electronic image, the display panel including a rear side;
a cover bottom configured to cover the rear side of the display panel;
a plurality of sound-generating actuators fixed to the cover bottom and configured to directly contact and directly vibrate the display panel to generate sound, the plurality of sound-generating actuators including at least a first sound-generating actuator and a second sound-generating actuator; and
a reinforcing rib part configured to maintain a distance between the first sound-generating actuator and the second sound-generating actuator,
wherein the reinforcing rib part comprises:
a first longitudinal rib part extending in a longitudinal direction,
a second longitudinal rib part in the longitudinal direction, and
a transverse rib part extending perpendicularly to the second longitudinal rib part.

19. The apparatus of claim 18, wherein the distance between the first sound-generating actuator and the second sound-generating actuator is less than 28 mm.

20. The apparatus of claim 18, wherein the first sound-generating actuator and the second sound-generating actuator are configured to receive a same control signal for vibrating the display panel.

21. The apparatus of claim 18, wherein the reinforcing rib part comprises one or more diagonal rib parts that extend diagonally relative to a side of the display panel.

* * * * *